(12) United States Patent
Walsh

(10) Patent No.: US 12,333,342 B1
(45) Date of Patent: Jun. 17, 2025

(54) HARDWARE APPARATUS FOR NETWORK COMMUNICATIONS

(71) Applicant: Parry Labs, LLC, Alexandria, VA (US)

(72) Inventor: David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/969,593

(22) Filed: Dec. 5, 2024

(51) Int. Cl.
*G06F 9/50* (2006.01)

(52) U.S. Cl.
CPC .................. *G06F 9/5027* (2013.01)

(58) Field of Classification Search
CPC .................................................. G06F 9/5027
See application file for complete search history.

(56) References Cited

U.S. PATENT DOCUMENTS

| | | | | |
|---|---|---|---|---|
| 2016/0035224 A1* | 2/2016 | Yang | ...................... | G08G 5/723 701/23 |
| 2018/0224854 A1* | 8/2018 | Mullan | ................... | H04L 67/12 |
| 2019/0229800 A1* | 7/2019 | Schloemer | ......... | H04B 7/18584 |
| 2022/0173796 A1* | 6/2022 | Schloemer | ............ | H04W 40/02 |
| 2022/0317290 A1* | 10/2022 | Kostanic | ............... | G01S 5/0246 |
| 2023/0115735 A1* | 4/2023 | Harada | ............. | H04B 7/18517 370/315 |
| 2024/0056164 A1* | 2/2024 | Matsuda | ............... | H04L 1/1685 |

* cited by examiner

*Primary Examiner* — Sisley N Kim
(74) *Attorney, Agent, or Firm* — Caldwell Intellectual Property Law

(57) ABSTRACT

A hardware apparatus for network communications, the apparatus including a graphics processing unit, a central processing unit, a modular network interface and a plurality of logic circuits wherein one or more logic circuits are configured for at least one data protocol and wherein the plurality of logic circuits are configured to receive transmission data from the modular network interface, wherein the transmission data comprises header information, identify at least one logic circuit of the plurality of logic circuits as a function of the header information, decode the transmission data using the at least one logic circuit and route the decoded transmission data; wherein the hardware apparatus is configured to receive a first program instruction set, allocate a first processing core from the first plurality of processing cores and a second processing core from the second plurality of processing cores to the first program instruction set.

20 Claims, 5 Drawing Sheets

HARDWARE APPARATUS FOR NETWORK COMMUNICATIONS

FIELD OF THE INVENTION

The present invention generally relates to the field of network communications. In particular, the present invention is directed to a hardware apparatus for network communications.

BACKGROUND

Current hardware is designed for specific tasks or operating environments. As a result, current hardware can face computability issues when assigning differing tasks or implementing differing operating environments on the hardware. Such issues may include incompatibility with network protocols, incompatibility with data transmission and the like. Current hardware or systems lack the capability to dynamically adapt to differing networks or differing operating environments.

SUMMARY OF THE DISCLOSURE

In an aspect, a hardware apparatus for network communications is described. The hardware apparatus includes a graphics processing unit including a first dedicated memory and a first plurality of processing cores, a central processing unit including a second dedicated memory and a second plurality of processing cores and a modular network interface. The hardware apparatus a plurality of logic circuits wherein one or more logic circuits of the plurality of logic circuits are configured for at least one data protocol and wherein the plurality of logic circuits are configured to receive transmission data from the modular network interface, wherein the transmission data comprises header information, identify at least one logic circuit of the plurality of logic circuits as a function of the header information, decode the transmission data using the at least one logic circuit and route the decoded transmission data. The hardware apparatus is configured to receive a first program instruction set and allocate a first processing core from the first plurality of processing cores and a second processing core from the second plurality of processing cores to the first program instruction set.

In another aspect, yet another hardware apparatus for network communications is described. The hardware apparatus includes a graphics processing unit including a first dedicated memory and a first plurality of processing cores, a central processing unit including a second dedicated memory and a second plurality of processing cores and a modular network interface. The hardware apparatus further includes a plurality of logic circuits wherein one or more logic circuits of the plurality of logic circuits are configured for at least one data protocol and wherein the plurality of logic circuits are configured to receive transmission data wherein the transmission data comprises header information, identify at least one logic circuit of the plurality of logic circuits as a function of the header information, encode the transmission data as a function of the transmission data and the at least one logic circuit and route the encoded transmission data through the modular network interface. The hardware apparatus is configured to receive a first program instruction set and allocate a first processing core from the first plurality of processing cores and a second processing core from the second plurality of processing cores to the first program instruction set.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to hardware apparatus for network communications. In an aspect, embodiments of the present disclosure include an FPGA configured to receive data encode the data and transmit the data. In an aspect, embodiments, of the present disclosure include an FPGA configured to receive data from a network and route the data to a central processor. Aspects of the present disclosure allow for network communications isolated from a software. Exemplary embodiments illustrating aspects of the present disclosure are described below in the context of several specific examples.

In some embodiments, apparatus and/or system as described in this disclosure may host and/or store data archival software; data archival software may be used, without limitation, to store voice, video, mission-related, and/or navigational or flight plan data relating to one or more vehicles such as UAVs. Apparatus and/or system may coordinate and/or support network traffic between multiple workstations and/or computing devices; for instance, apparatus and/or system may support network traffic between two workstations, one configured as an aircraft operator and another as a payload operator.

Figure 1:
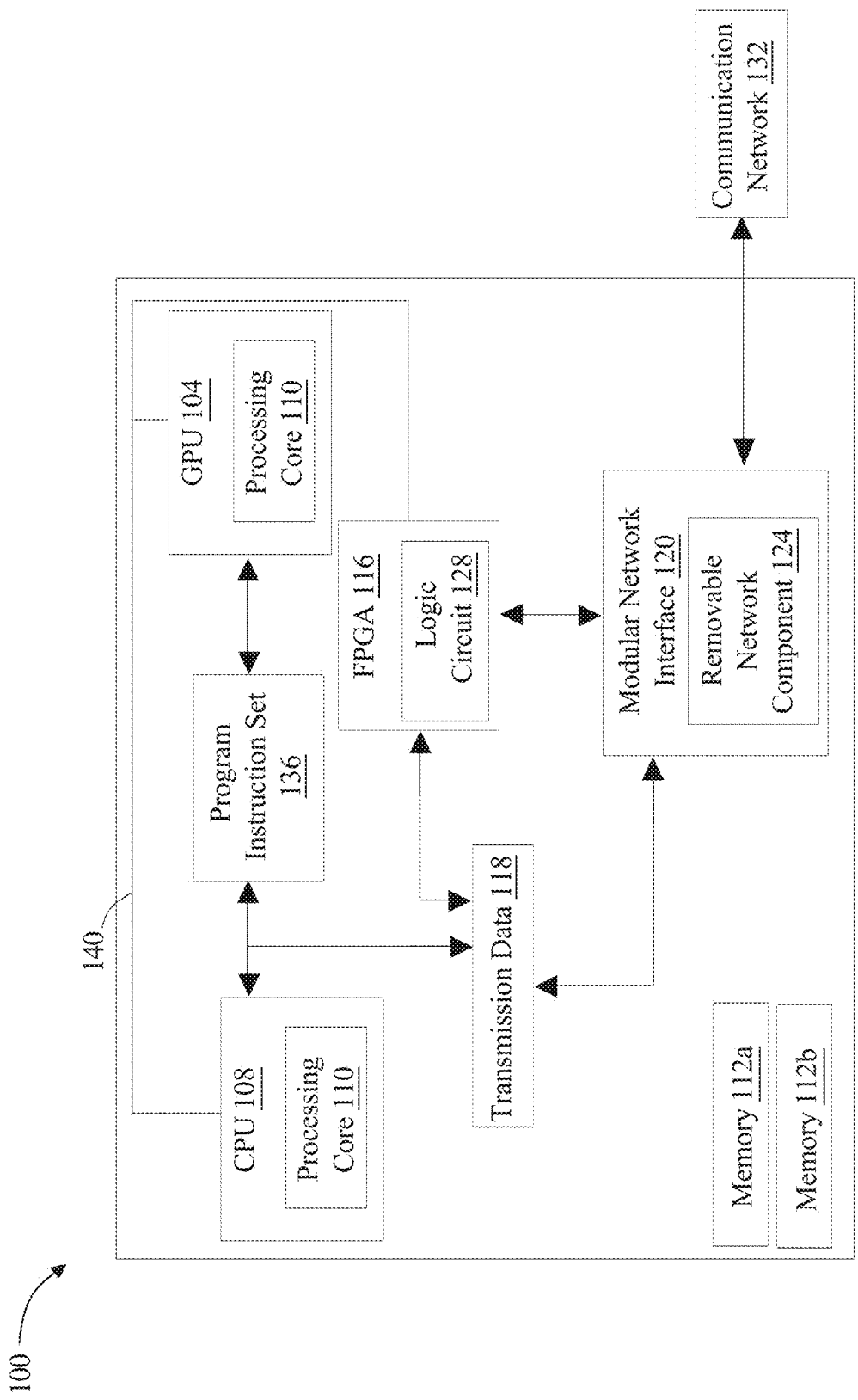
FIG. 1 is a block diagram of a hardware apparatus for network communications.

Referring now to FIG. 1, an exemplary embodiment of a hardware apparatus 100 is described. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include software instructions in memory and/or may receive software instructions from an external computing device. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Still referring to FIG. 1, in some embodiments, apparatus 100 may include a Graphics Processing Unit (GPU) 104. GPU 104 may include a type of computer chip often used for graphics related tasks such as 3D rendering. In some embodiments, GPU 104 may contain more, smaller, and more specialized cores than a typical CPU, allowing it to run larger sets of functions at once. In addition to 3D rendering, GPU 104 may also be used for other functions, such as those in which operations must be performed on large matrices of data. In non-limiting examples, GPU 104 may have applications in cryptography and machine learning.

Still referring to FIG. 1, in some embodiments, apparatus 100 may include a plurality of streaming multiprocessors, an L2 cache, and/or a DRAM. In some embodiments, each streaming multiprocessor may include one or more instruction schedulers and instruction execution pipelines. In some embodiments, a GPU may group threads into thread blocks and may execute such thread blocks. In some embodiments, dependent instruction latency may be mitigated by switching to execution of other threads.

Still referring to FIG. 1, a processor such as GPU 104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; a processor may be organized according to Von Neumann and/or Harvard architecture as a non-limiting example. A processor may include, incorporate, and/or be incorporated in, without limitation, a microcontroller, microprocessor, digital signal processor (DSP), FPGA, Complex Programmable Logic Device (CPLD), GPU, CPU, Tensor Processing Unit (TPU), analog or mixed signal processor, Trusted Platform Module (TPM), a floating point unit (FPU), system on module (SOM), and/or system on a chip (SoC).

Still referring to FIG. 1, in some embodiments, GPU 104 may use a system on a module (SOM) design. In some embodiments, a SOM GPU may include NVIDIA Jetson NX or Google Coral. In some embodiments, a GPU may use a Chip Down Design.

Still referring to FIG. 1, in some embodiments, apparatus 100 may include a GPU dedicated memory. A dedicated memory may be physically closer to GPU 104 and may be configured for fast and/or efficient access by GPU 104. In some embodiments, a dedicated memory for GPU 104 may include persistent memory. In some embodiments, a dedicated memory for GPU 104 may include temporary memory. In some embodiments, inclusion of a dedicated memory for GPU 104 may improve the efficiency of apparatus 100 in comparison to retrieval of information from a general purpose memory. Optionally, a dedicated memory for GPU 104 may include 72-bit DDR4 memory. In some embodiments, GPU dedicated memory may be accessible only by GPU 104. In some embodiments, GPU dedicated memory may be accessible by GPU 104, CPU 108, and/or FPGA 116.

Still referring to FIG. 1, software run on apparatus 100 may include a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Still referring to FIG. 1, in some embodiments, apparatus 100 may include Central Processing Unit (CPU) 108. CPU 108 may include a general purpose computer processor. CPU 108 may include a Reduced Instruction Set Computer (RISC) processor. In some embodiments, RISC processors may include less complicated functions than a Complex Instruction Set Computer (CISC). In some embodiments, this may allow individual instructions to be performed more quickly on a RISC processor than a CISC processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozen of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory 112A and/or 112B may be accessed through LOAD i.e., to load a memory location and STORE i.e., to write to it, wherein all other instructions may operate on one or more processor registers and processor may not have direct access to manipulate memory 112A and/or 112B. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory 112A and/or 112B, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like. Exemplary embodiments of CPUs are described in further detail below with reference to FIG. 2.

Still referring to FIG. 1, in some embodiments, apparatus 100 may include CPU dedicated memory, such as CPU dedicated memory 112A and 112B. In some embodiments, CPU dedicated memory 112A and/or 112B may include persistent memory. In some embodiments, CPU dedicated memory 112A and/or 112B may include temporary memory. In some embodiments, inclusion of CPU dedicated memory 112A and/or 112B may improve the efficiency of apparatus 100 in comparison to retrieval of information from a general purpose memory. In some embodiments, CPU dedicated memory 112A and/or 112B may include ECC memory. In some embodiments, CPU dedicated memory 112A and/or 112B may include 72-bit DDR4 memory. In some embodiments, CPU dedicated memory 112A and/or 112B may be accessible only by CPU 108. In some embodiments, CPU dedicated memory 112A and/or 112B may be accessible by GPU 104, CPU 108, and/or FPGA 116.

It is also contemplated that multiple computing devices may be utilized to implement a specially configured set of instructions for causing one or more of the devices to perform any one or more of the aspects and/or methodologies of the present disclosure. Hardware apparatus 100 may include a processor and a memory that communicate with each other, and with other components, via a bus. Bus may include any of several types of bus structures including, but not limited to, a memory bus, a memory controller, a peripheral bus, a local bus, and any combinations thereof, using any of a variety of bus architectures.

Processor and/or CPU 108 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor may be organized according to Von Neumann and/or Harvard architecture as a non-limiting example. Processor may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 112*a-b* may include various components (e.g., machine-readable media) including, but not limited to, a random-access memory component, a read only component, and any combinations thereof. In one example, a basic input/output system (BIOS), including basic routines that help to transfer information between elements within hardware apparatus 100, such as during start-up, may be stored in memory. Memory may also include (e.g., stored on one or more machine-readable media) instructions (e.g., software)

embodying any one or more of the aspects and/or methodologies of the present disclosure. In another example, memory may further include any number of program modules including, but not limited to, an operating system, one or more application programs, other program modules, program data, and any combinations thereof.

Hardware apparatus 100 may also include a storage device. Examples of a storage device (e.g., storage device) include, but are not limited to, a hard disk drive, a magnetic disk drive, an optical disc drive in combination with an optical medium, a solid-state memory device, and any combinations thereof. Storage device may be connected to bus by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device (or one or more components thereof) may be removably interfaced with hardware apparatus 100 (e.g., via an external port connector (not shown). Particularly, storage device and an associated machine-readable medium may provide nonvolatile and/or volatile storage of machine-readable instructions, data structures, program modules, and/or other data for hardware apparatus 100. In one example, software may reside, completely or partially, within machine-readable medium. In another example, software may reside, completely or partially, within processor.

Hardware apparatus 100 may also include an input device. In one example, a user of hardware apparatus 100 may enter commands and/or other information into hardware apparatus 100 via input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device may be interfaced to bus via any of a variety of interfaces (not shown) including, but not limited to, a serial interface, a parallel interface, a game port, a USB interface, a FIREWIRE interface, a direct interface to bus, and any combinations thereof. Input device may include a touch screen interface that may be a part of or separate from display, discussed further below. Input device may be utilized as a user selection device for selecting one or more graphical representations in a graphical interface as described above. In an embodiment, input device may be configured to detect audio input data. As used in this disclosure, "audio input data" is a collect of digital recordings of sound detected by an input device. For example, audio input data may include speech recordings, environmental recordings, and the like.

A user may also input commands and/or other information to hardware apparatus 100 via storage device (e.g., a removable disk drive, a flash drive, etc.) and/or network interface device. A network interface device, such as network interface device, may be utilized for connecting hardware apparatus 100 to one or more of a variety of networks, such as network, and one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network, may employ a wired and/or a wireless mode of communication. In general, any network topology may be used. Information (e.g., data, software, etc.) may be communicated to and/or from hardware apparatus 100 via network interface device.

Hardware apparatus 100 may further include a video display adapter for communicating a displayable image to a display device, such as display. Examples of a display device include, but are not limited to, a liquid crystal display (LCD), a cathode ray tube (CRT), a plasma display, a light emitting diode (LED) display, and any combinations thereof. Display adapter and display may be utilized in combination with processor to provide graphical representations of aspects of the present disclosure. In addition to a display device, hardware apparatus 100 may include one or more other peripheral output devices including, but not limited to, an audio speaker, a printer, and any combinations thereof. Such peripheral output devices may be connected to bus via a peripheral interface. Examples of a peripheral interface include, but are not limited to, a serial port, a USB connection, a FIREWIRE connection, a parallel connection, and any combinations thereof.

With continued reference to FIG. 1, apparatus 100 includes a modular network interface 120. A "modular network interface" for the purposes of this disclosure refers to a networking component capable of communicating with more than one communication networks 132. For example, and without limitation, modular network interface 120 may be capable of communicating through Wi-Fi, satellite internet, Ethernet, and/or the like. A "communication network" for the purposes of this disclosure is a system that enables the exchange of data between devices or systems. Communication networks 132 may be wired, wireless and/or a combination of both. In one or more embodiments, communication networks 132 may include, but are not limited to, Local area networks, Wide area networks, data center networks, cloud networks, wireless networks, Wi-Fi, 3G, 4G, 5G, Bluetooth, radio access networks, fiber optic networks, satellite networks, microwave networks, ethernet networks, optical transport networks, virtual networks, Tactual data links, satellite communication networks 132 (SATCOM), mobile ad-hoc networks, mesh networks, high-frequency radio networks, edge computing networks, space-based networks and/or any other network in which data may be exchanged. In one or more embodiments, processor may receive transmission data to be transmitted. In one or more embodiments, systems and/or software may transmit transmission data to modular network interface 120, wherein data may be transmitted through modular network interface 120 and/or received through modular network interface 120. In one or more embodiments, modular network interface 120 may include one or more network interface devices. Network interface device may be utilized for connecting computing device or apparatus 100 to one or more of a variety of networks, and one or more devices. In an exemplary embodiment, network interface device may be configured to connect apparatus 100 to a plurality of portable ground control stations, such as describe herein. Further, for example, a first portable ground control station of the plurality of portable ground control stations may be configured as an aircraft operator and a second portable ground control station of the plurality of portable ground control stations may be configured as a payload operator. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In one or more embodiments, network interface devices may include an RJ-45 connector. In one or more embodiments, an RJ-45 connected may be used to ethernet networking. In one or more embodiments, modular network interface 120 may include 4-45 ports wherein multiple ethernet connections may be utilized at the same time. In one or more embodiments, modular network interface 120 may include 4 RJ-45 10/100/1000 Ethernet ports wherein the 4 ethernet pots support ethernet standards 10BASE-T, 100BASE-TX and 1000BASE-T. In one or more embodiments, modular network interface may include 2 RJ-45 1000/10000 ethernet, wherein the 2 ports support gigabit ethernet and 10 gigabit ethernet. In one or more embodiments, network interface device and/or modular network interface 120 may include two small form-factor pluggable (SFP) SR Optics LC fiber modules ports. In one or more embodiments, SFP ports may allow for data communications. In one or more embodiments, the SFP ports may transmit data at 10 gigabytes per second (Gbps). In or more embodiments, SFP port may include an optical transceiver designed for short range communication. In one or more embodiments, SFP port may include LC fiber modules. In one or more embodiments, network interface device may further include 2 LC Fiber Optics 1000SX SR Optics ports. In one or more embodiments, the LC ports may include the use of LC connectors for fiber optics. In one or more embodiments, LC ports may allow for gigabit ethernet connections over short distances using fiber optics. In one or more embodiments, modular network interface 120 may be capable of layer 3 virtual appliance networking. In one or more embodiments, modular network interface 120 may be configured to route packets across networks. In one or more embodiments, modular network interface 120 may be configured to interface with virtual routers and/or virtual firewalls that operate at layer 3. In one or embodiments, modular network interface 120 may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may communicate through a communication network 132.

With continued reference to FIG. 1, modular network interface 120 includes one or more removable network components 124. A "removable network component" for the purposes of this disclosure refers to a network interface device capable of being removably connected to modular network interface 120. For example, and without limitation, LAN cards may be removed from modular network interface 120 and replaced with other interface devices. In one or more embodiments, modular network interface 120 may be configured to receive a plurality of network interface devices, wherein network interface devices may be interchanged based on the needs of hardware apparatus 100. In one or more embodiments, removable network components 124 may include tactical radios, layer 3 switches, antennas, encryptions units various network interface cards and/or the like. In one or more embodiments, removable network components 124 may include any network components that may allow for communication or connection to communication network 132. In one or more embodiments, removable network component 124 may include an SFP port. In one or more embodiments, SFP may be added to modular network component and/or removed based on the current needed of hardware apparatus. In one or more embodiments removable network components 124 may include multiband radios, high frequency radios, ultra-high frequency radios, satellite radios, link 16 tactical data links and/or the like. In one or more embodiments, modular network interface 120 may include removable slots that allow for removable network components 124 to be placed within, and/or removed from, modular network interface 120. In one or more embodiments, removable network components 124 may be attached to modular network interface 120 through one or more ports as described above. In one or more embodiments, removable network components 124 may be communicatively connected to modular network interface 120 through the use of USB connections, ethernet connections and/or serial connections. In one or more embodiments, modular network interface 120 may include USB ports, ethernet ports, or serial connections wherein removable network components 124 may connect to modular network interface 120. In one or more embodiments, modular network interface 120 may include express card slots, PCMIA slots, serial interfaces (e.g. RS-232 or RS-485), ethernet ports, and/or any other connection interfaces that may allow for connection of removable interface components to modular network interface 120. In one or more embodiments, removable network component 124 may include small form-factor pluggable module. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture. In one or more embodiments, hardware apparatus 100 may include computing device.

Still referring to FIG. 1, in some embodiments, apparatus 100 includes Field Programmable Gate Array (FPGA) 116. FPGA 116 may include a chip that may be programmed and/or reprogrammed after manufacturing. FPGA 116 may include a series of registers and logic gates. In some embodiments, FPGA 116 registers may be turned on and off in order to program FPGA 116. This may be used to, for example, run a specific algorithm many times using hardware rather than software instructions. In some embodiments, once configured, FPGA 116 may perform processing functions much faster than software instruction solutions. In some embodiments, FPGA 116 may include a KINTEX UltraSCALE FPGA. In some embodiments, FPGA 116 may include an Intel Agilex 7 FPGA F-Series.

Still referring to FIG. 1, FPGA 116 may perform one or more processing tasks for one or more operating environments. In one or more embodiments, FPGA 116 may receive and/or transmit data to one or more operating environment operating on portable ground control station 100. In one or more embodiments, hardware components of portable ground control station 100 may be allocated to one or more operating environments, wherein FPGA 116 may be configured to communicate with the allocated hardware components. In one or more embodiments, FPGA 116 may be configured to communicate with allocated hardware components through BUS 116, a virtual Bus and/or the like. In one or more embodiments, hardware components of apparatus may be allocated or implemented, without limitation, as described in U.S. Nonprovisional application Ser. No. 18/422,437 filed on Jan. 25, 2024, entitled "FIELD-DEPLOYABLE HARDWARE APPARATUS", the entirety of which is incorporated herein by reference With continued reference to FIG. 1, FPGA 116 may include and/or be included in an edge computer as described in reference to at least FIG. 2. In one or more embodiments, edge computer may be configured to perform local processing operations from network devices, sensors and/or the like. In one or more embodiments, edge computer may be configured to process data from one or more network devices prior to receipt by a processing unit. In one or more embodiments, edge computer may receive data from sensors and/or other external components communicatively connected to hardware apparatus 100 and processes data prior to receipt by CPU. In one or more embodiments, Edge computer may perform one or more processes as described in this disclosure. In one or more embodiments, edge computer may be used in lieu and/or in parallel with FPGA 116. In one or more embodiments, hardware apparatus 100 may include edge computer, wherein edge computer may be configured to perform one or more tasks assigned to FPGA 116 as described in this disclosure. Edge computer is described in further detail below. In one or more embodiments, FPGA may include and/or be included in apparatus 300 as described in reference to FIG. 3. In one or more embodiments, apparatus 300 may perform any steps as described in reference to FPGA in this disclosure.

With continued reference to FIG. 1, FPGA 116 may be included within modular network interface 120. In one or more embodiments, one or more processes or steps by FPGA 116 as described in this disclosure may be performed by modular network interface 120. In one or more embodiments, modular network interface 120 may include a computing system and/or edge computer configured to process transmissions at the source. In one or more embodiments, modular network interface 120 may include FPGA and/or a plurality of logic circuits 128 and perform one or more operations on transmission data 118. In one or more embodiments, modular network interface 120 may perform any operations assigned to FPGA 116 as described in this disclosure. In one or more embodiments, modular network interface 120 may include logic circuits 128 configured to perform one or more steps as described in this disclosure. In one or more embodiments, modular network interface may include edge computer.

Still referring to FIG. 1, in some embodiments, apparatus 100 may include an FPGA dedicated memory, such as FPGA dedicated memory. In some embodiments, FPGA dedicated memory and/or may include persistent memory. In some embodiments, FPGA dedicated memory and/or may include temporary memory. In some embodiments, inclusion of FPGA dedicated memory and/or may improve the efficiency of apparatus 100 in comparison to retrieval of information from a general purpose memory. In some embodiments, FPGA dedicated memory and/or may include ECC memory. In some embodiments, FPGA dedicated memory and/or may include 72-bit DDR4 memory. In some embodiments, FPGA dedicated memory and/or may be accessible only by FPGA 116. In some embodiments, FPGA dedicated memory and/or may be accessible by GPU 104, CPU 108, and/or FPGA 116.

Still referring to FIG. 1, in some embodiments, apparatus 100 may include FPGA Mezzanine Card (FMC). In some embodiments, FMC may be used to transfer data in and/or out of FPGA 116. In some embodiments, FMC may connect to an external computing device. In a non-limiting example, apparatus 100 may receive instructions and/or other data through FMC. In another non-limiting example, apparatus 100 may output data through FMC. FMC may conform to FMC standards.

Still referring to FIG. 1, in some embodiments, apparatus 100 may include Virtual Path Cross-Connect (VPX) module. VPX module may conform to VPX standards. VPX module may be used for input and/or output of signals from apparatus 100. VPX module may be communicatively connected to an external computing device and/or an external component of a computing device. VPX module may include a 3U VPX. VPX module may include a 6U VPX.

Still referring to FIG. 1, portable ground control station may include a virtual-path cross-connect controller card. A "VPX controller card" for the purposes of this disclosure, is a controller card that has met the standards and/or limitations of the VMEbus International Trade Association (VITA). VPX standards may include standards such as but not limited to, specific size requirements, various high spend requirements. In one or more embodiments, VPX components may adhere to one of two form factors: a 3U form factor wherein the component must have a maximum width of 100 millimeters (mm) and a 6U form factor. In one or more embodiments VPX controller card may include a controller card having a maximum width of 100 millimeters. In one or more embodiments, VPX controller card may include a maximum width of millimeters. In one or more embodiments, VPX controller card may include a 3U VPX controller card. In one or more embodiments, VPX controller card may contain a MultiGig RT2 connector or a MultiGig RT3 connector. In one or more embodiments, VPX components may follow an OpenVPX standard (VITA 66 and/or VITA 67) as established by the VMEbus International Trade Association. In one or more embodiments, VPX components such as, but not limited to VPX controller card may contain temperature range requirements wherein the component must be able to operate between temperature of −40 degrees Celsius to 80 degrees Celsius. In one or more embodiments, VPX component may support high speed fabric interconnects in the range of 10 gbps to 100 gbps. In one or more embodiments, VPX component may contain secure boot software, tamper detection software and/or encrypted software. In one or more embodiments, VPX controller card may be encrypted. In one or more embodiments, VPX controller card may contain a secure boot software. In one or more embodiments, VPX controller card may contain components that have been VPX certified and/or components that adhere to VPX standards. For example, and without limitation, embedded processors may include a VPX embedded processor wherein the embedded processor may adhere to VPX standards. In an embodiment, VPX controller card may, as a non-limiting example, enable and/or govern connection of elements of bus to one another and/or to exterior and/or peripheral devices, such as without limitation devices connected via input/output ports to field-deployable hardware module.

With continued reference to FIG. 1, FPGA 116 may include a plurality of logic circuits. A "logic circuit" for the purposes of this disclosure is device that performs logical operations on binary inputs to produce binary outputs. In one or more embodiments, each logic circuit with FPGA 116 may be tasked with a single logical operation. In one or more embodiments, in contrast to a processor in which logical operations are already programmed within the processor, logic circuits within FPGA 116 may be programmed and reprogrammed by an individual. In one or more embodiments, FPGA 116 may include a plurality of logic circuits wherein each logic circuit may be configured to perform a differing operation. In one or more embodiments, logic circuits may be configured to perform basic logic operations such as, but not limited to, AND, OR and/or NOT. In one or more embodiments, logic circuits may be configured and/or programmed to processes signals, handle data transmissions, encode or decode binary information, processor digital signals, encrypt data, perform image processing and/or the like. In one or more embodiments, logic circuits may be configured to handle routing packets, extract and interpret headers of packets, determine the next hop for a packets based on its destination IP and/or the like. In one or more embodiments, logic circuits are programmed into hardware using hardware description languages (HDL). In one or more embodiments, logic circuits may be programed to handle one or more networking capabilities, such as but not limited to, identifying network devices, decoding data packets, converting data from one network protocol to another and/or the like.

With continued reference to FIG. 1, one or more logic circuits may be configured and/or programmed for one or more data protocols. A "data protocol" for the purposes of this disclosure is a specific set of rules that govern how data is exchanged between two or more devices. In one or more embodiments, data protocols may include network protocols. The rules may govern how data is packaged, transmitted and received. For example, and without limitation, data protocol may include Link-16, wherein Link-16 may include a high-speed digital data link in which data is transmitted over an ultra-high frequency band. In one or more embodiments, data protocols may include but are not limited to LINK-16, United States Military standard (MIL-STD), Defense Data network (DDN), Tactical Data Link (TDL), Byzantine fault-tolerant (BFT) protocols, STANAG 4586, Real Application Cluster (RAC), RAC2, transmission control protocols (TCP), user datagram protocols (UDP), internet protocols (IP), dynamic Host configuration protocols (DHCP), IEEE, Zigbee, DASH7, digital audio broadcasting, and the like. In one or more embodiments, data protocols may include but are not limited to, micro air vehicle link (MAVLink), pulse width modulation (PWM), real-time streaming protocol (RSTP), Long range (LoRa), 2.4 GHz, 5.8 GHz, amplitude modulation (AM), frequency modulation (FM), Situational awareness data link (SADL), tactical radios and/or the like. In one or more embodiments, each data protocol may contain a specific set of rules that govern how data can be packaged, transmitted and/or received. In one or more embodiments, each data protocol may be associated with each RF control channel 120. In one or more embodiments, data associated with each data protocol may require particular file formats. For example and without limitation, a particular datum may be converted into a geographic information system (GIS) file format in instances in which the datum contains geographical information. A "designated data protocol" for the purposes of this disclosure is a particular data protocol in which a device is configured to follow. For example, and without limitation, a sensor may contain Link-16 as its designated data protocol wherein data packaged, transmitted and/or received may adhere to Link-16 protocols.

With continued reference to FIG. 1, each logic circuit may be configured for one or more data protocols, wherein logic circuits may be programmed to decode incoming packets, extract headers and payloads, decode destinations addresses, directing packets and/or the like. In one or more embodiments, each data protocol may include specific rules, formats timing requirements and/or the like wherein each logic circuit may be configured to handle data associated with a particular data protocol. In one or more embodiments, differing data protocols define differing header formats, different payload structures, differing error-checking mechanism, and/or the like. In one or more embodiments, logic circuits may be configured and/or programmed to convert data between different data protocols. For example, and without limitation, FPGA 116 may receive data in a first format containing a first data protocol and convert the data into a second format having a second data protocol.

Still referring to FIG. 1, apparatus 100 may include a processor and a memory that communicate with each other, and with other components, via a bus. A bus may include any of several types of bus structures including, but not limited to, a memory bus, a memory controller, a peripheral bus, a local bus, and any combinations thereof, using any of a variety of bus architectures.

Still referring to FIG. 1, in some embodiments, apparatus 100 may include control and bus assembly 140. Control and data bus assembly 140 may include any of several types of bus structures including, but not limited to, a memory bus, a memory controller, a peripheral bus, a local bus, and any combinations thereof, using any of a variety of bus architectures. Control and data bus assembly 140 may connect GPU 104, CPU 108, and/or FPGA 116. Components connected by control and bus assembly 140 may communicate using an API configured to enable the division of processing tasks between the FPGA, the CPU, and the GPU. In some embodiments, an API may allow code to run on varying hardware, such as GPU 104, CPU 108, and/or FPGA 116, rather than being limited to a particular hardware architecture. In some embodiments, different computing tasks may be performed more efficiently on different architectures. For example, a first computing task may be performed more efficiently on GPU 104, a second computing task may be performed more efficiently on CPU 108, and a third computing task may be performed more efficiently on FPGA 116. In another example, a computing task may have multiple components which may be split between GPU 104, CPU 108, and FPGA 116 such that all available processing power is used. In some embodiments, inclusion of GPU 104, CPU 108, and FPGA 116, and division of computing tasks between them, may provide improvements to speed and/or efficiency of apparatus 100.

Continuing to refer to FIG. 1, in one or more embodiments, FPGA may be configured to communicate with each processor, wherein processor cores may be isolated from one another. In one or more embodiments, FPGA may be configured to isolate processor cores may communicating directly with each processor core separately. In one or more embodiments, logic circuits within FPGA may be configured to isolate processing cores. In one or more embodiments, FGPA may include a custom Bus architecture that allocated specific bus resources to each processor core or virtual environment. In one or more embodiments, FPGA may be utilized for custom communication interconnections between processor CPU and GPU that ensure data is only transferred along designated paths. Each operating environment may have its own isolated bus for data transfer, preventing unauthorized access to data from other operating environments. In one or more embodiments, specific memory regions may be allocated in FPGA for each operating environment, ensuring that other operating environments cannot access each other's memory. In one or more embodiments, FPGA may be used to implement a custom bus architecture tailored for the specific needs of each operating environment. This bus can include separate channels for each operating environment in order to prevent cross communications. In one or more embodiments, each operating environment may be assigned its own data line on a BUS ensuring that data does not interact with one another. In one or more embodiments, FPGA may utilize a plurality of logic circuits wherein each logic circuit may be configured to communicate information to a separate processor core. In one or more embodiments, logic circuits may be used to ensure that data from one operating environment does not communicate with another operating environment.

With continued reference to FIG. 1, modular network interface 120 may be communicatively connected to FPGA 116. In one or more embodiments, modular network interface 120 may communicate directly with FPGA 116 wherein information received from modular network interface 120 may be transmitted directly to FPGA 116, wherein FPGA 116 may be responsible for transmission of data to other portions of apparatus such as, for example, CPU 108. In one or more embodiments, FPGA 116 may alternatively directly communicate with modular network interface wherein data received from FPGA 116 may be communicated directly to modular network interface 120. In one or more embodiments, communication connection between FPGA 116 and modular network interface may be done through the use of a peripheral component interconnect express (PCIe bus). In one or more embodiments, FPGA 116 may be integrated into a PCIe card and directly into a slot on a motherboard wherein FPGA 116 may communicate directly with modular network interface 120. In one or more embodiments, direct placement of FPGA 116 into PCIe bus may allow for FPGA 116 to bypass CPU 108 and communicate directly with modular network interface 120. In one or more embodiments, FPGA 116 may include an ethernet physical layer (PHY), wherein FPGA 116 may communicate directly within an ethernet cable. In one or more embodiments, FPGA 116 may communicate with CPU 108 and/or communicate with modular network interface through CPU 108. In one or more embodiments, FPGA 116 may communicate with CPU 108 108 wherein CPU 108 may forward information to modular network interface 120. In one or more embodiments, FPGA 116 may communicate with both CPU 108 and modular network interface 120.

With continued reference to FIG. 1, FPGA 116 may include a plurality of logic circuits 128. A "logic circuit" for the purposes of this disclosure is device that performs logical operations on binary inputs to produce binary outputs. In one or more embodiments, each logic circuit 128 with FPGA 116 may be tasked with a single logical operation. In one or more embodiments, in contrast to a processor in which logical operations are already programmed within the processor, logic circuits 128 within FPGA 116 may be programmed and reprogrammed by an individual. In one or more embodiments, FPGA 116 may include a plurality of logic circuits 128 wherein each logic circuit 128 may be configured to perform a differing operation. In one or more embodiments, logic circuits 128 may be configured to perform basic logic operations such as, but not limited to, AND, OR and/or NOT. In one or more embodiments, logic circuits 128 may be configured and/or programmed to processes signals, handle data transmissions, encode or decode binary information, processor digital signals, encrypt data, perform image processing and/or the like. In one or more embodiments, logic circuits 128 may be configured to handle routing packets, extract and interpret headers of packets, determine the next hop for a packet based on its destination IP and/or the like. In one or more embodiments, logic circuits 128 are programmed into hardware using hardware description languages (HDL). In one or more embodiments, logic circuits 128 may be programed to handle one or more networking capabilities, such as but not limited to, identifying network devices, decoding data packets, converting data from one network protocol to another and/or the like.

With continued reference to FIG. 1, one or more logic circuits 128 may be configured and/or programmed for one or more data protocols. "Data protocol," for the purposes of this disclosure is a specific set of rules that govern how data is exchanged between two or more devices. In one or more embodiments, data protocols may include network protocols. The rules may govern how data is packaged, transmitted and received. For example, and without limitation, data protocol may include Link-16, wherein Link-16 may include a high-speed digital data link in which data is transmitted over an ultra-high frequency band. In one or more embodiments, data protocols may include but are not limited to LINK-16, United States Military standard (MIL-STD), Defense Data network (DDN), Tactical Data Link (TDL), Byzantine fault-tolerant (BFT) protocols, STANAG 4586, Real Application Cluster (RAC), RAC2, transmission control protocols (TCP), user datagram protocols (UDP), internet protocols (IP), dynamic Host configuration protocols (DHCP), IEEE, Zigbee, DASH7, digital audio broadcasting, and the like. In one or more embodiments, each data protocol may contain a specific set of rules that govern how data can be packaged, transmitted and/or received. In one or more embodiments, data associated with each data protocol may require particular file formats. For example, and without limitation, a particular datum may be converted into a geographic information system (GIS) file format in instances in which the datum contains geographical information. "Designated data protocol," for the purposes of this disclosure is a particular data protocol in which a device is configured to follow. For example, and without limitation, a sensor may contain Link-16 as its designated data protocol wherein data packaged, transmitted and/or received may adhere to Link-16 protocols.

With continued reference to FIG. 1, each logic circuit 128 may be configured for one or more data protocols, wherein logic circuits 128 may be programmed to decode incoming packets, extract headers and payloads, decode destinations addresses, directing packets and/or the like. In one or more embodiments, each data protocol may include specific rules, formats, timing requirements and/or the like wherein each logic circuit 128 may be configured to handle data associated with a particular data protocol. In one or more embodiments, differing data protocols define differing header formats, different payload structures, differing error-checking mechanisms, and/or the like. In one or more embodiments, logic circuits 128 may be configured and/or programmed to convert data between different data protocols. For example, and without limitation, FPGA 116 may receive data in a first format containing a first data protocol and convert the data into a second format having a second data protocol.

With continued reference to FIG. 1, logic circuits 128 may be programed for data receptions, wherein logic circuits 128 may decode incoming packets to extract headers and payloads, detect errors, and temporarily store incoming data. In one or more embodiments, logic circuits 128 may be configured to transmit data wherein logic circuits 128 may be configured to construct outgoing packets according to designated data protocols. In one or more embodiments, logic circuits 128 may be programmed to identify destination addresses, implement routing algorithms, segment data and/or the like.

With continued reference to FIG. 1, FPGA 116 may be configured to send and/or receive data through and/or from modular network interface 120. In one or more embodiments, incoming transmission may first be transmitted to FPGA 116 wherein FPGA 116 may handle decoding transmission and transmitting the transmission to their appropriate environment.

With continued reference to FIG. 1, in one or more embodiments, FPGA 116 is configured to receive transmission data. "Transmission data" for the purposes of this disclosure is information that is to be transmitted from one device to another. For example, and without limitation, transmission data may include a transmission containing a text, audio data, operational data, a video message, an update to an existing software and/or the like. In one or more embodiments, transmission data may include, but is not limited to, information received from a sensing device, information received through modular network interface 120, information received from CPU 108 and/or the like. In one or more embodiments, transmission data may include any information passing through modular network interface 120, FPGA 116, and/or CPU 108. In one or more embodiments, transmission data may include information such as, but not limited to, additional software capabilities, additional system requirements, changes to one or more processes within a system, changes to the visual design of a system, changes to the user interface of a system and the like. In one or more embodiments, transmission data may be used to correct instructions and/or code on a software, to modify the capability of a software and the like. In one or more embodiments, transmission data may include information associated with a software that is to be modified. This may include but is not limited to the name of the software, compatibility information, system requirements, the date in which transmission data was generated for the software, the version number of transmission data, information indicating potential changes to the software, information indicating additions to the software and the like. In one or more embodiments transmission data may include modifications to a weapons system such as but not limited to, guided missile systems, smart bombs, automated defense systems, unmanned aerial vehicles, threat identification systems, Artificial intelligent algorithms, weapons, operational flight programs, avionics systems and the like. In one or more embodiments, transmission data may include modifications to an operating system, modifications to an operating system used for aviation, modifications to an aviation system, modifications to aircraft systems and the like. In one or more embodiments, transmission data may include communications made between two or more computing devices, such as but not limited, textual communications, audio communications, video communications and/or the like. In one or more embodiments, transmission data may include information received from recording devices such as, but not limited to, sensors, video cameras, audio recorder, and/or any other device capable of recording information.

With further reference to FIG. 1, apparatus 100, or components thereof including without limitation FPGA 116, may be configured to receive transmission data from a first portable ground control station of a plurality of ground control stations, such as described herein. In one or more embodiments, portable ground control station may include any portable ground control station, as described in U.S. Nonprovisional application Ser. No. 18/969,485 filed on Dec. 5, 2024, and entitled "PORTABLE GROUND CONTROL STATION", the entirety of which is incorporated herein by reference. In an embodiment, transmission data may include operational data associated with each portable ground control station of the plurality of ground control stations. As used in this disclosure, "operational data" is any information that is captured about functioning and processes associated with portable ground control stations. For example, operational data may include any data associated with tasks, operations, and other processes associated with plurality of portable ground control stations. Additionally, or alternatively, transmission data may include audio communication data associated with each portable ground control station of the plurality of ground control stations. In an embodiment, audio communication data may include any communications made between two or more computing devices, information received from recording devices, and the like, as described above. For example, transmission data may include any communications made between a plurality of portable ground control stations, audio communication data from a plurality of portable ground control stations, and the like.

With continued reference to FIG. 1, transmission data may include, and/or be associated with, a design assurance level (DAL) classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL classification. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL classification may contain minimum resource requirements such as minimum processing power, minimum space allocation, and the like. In one or more embodiments, transmission data may contain a DAL classification, wherein the DAL classification indicates the type of system or software in which transmission data was received from. In one or more embodiments, DAL classification may be determined based on the source of transmission data. For example, and without limitation, transmission data may contain the same DAL classification as the device from which it was transmitted.

In one or more embodiments, transmission data includes metadata. "Metadata" for the purposes of this disclosure refers to descriptive information about a particular set of data. For example, and without limitation, metadata may include a file size, a creation date, a source of transmission data and/or the like. In one or more embodiments, metadata may include header information wherein the header information may include information indicating how to process, route or interpret transmission data. In one or more embodiments, header information may include a source address, a destination address, protocol information indicating the protocol data used or required, the sequence numbers and/or the like. In one or more embodiments, transmission data may include a payload, wherein the payload corresponds to the actual data being transmitted. In one or more embodiments, each transmission within a network may include the actual file and the header information. In one or more embodiments, the header information may include the source of the file, the destination of the file, the particular network protocol being used and/or the like. In one or more embodiments, header information may be used to guide data and/or packet through a network and ensure that it reaches its destination. In one or more embodiments, header information may include but is not limited to, the source and destination of transmission data, frame types, the source IP address, the destination IP address, the time to live, and/or the transport protocol, she source port, the destination port, the sequence numbers and/or the like.

With continued reference to FIG. 1, In one or more embodiments, header information may include a source protocol and a target protocol. A "source protocol" for the purposes of this disclosure refers to a data protocol in which transmission data was received in. A "target protocol" for the purposes of this disclosure refers to the data protocol in which transmission data should be used for routing to a destination or recipient. In one or more embodiments, source protocols and target protocols may differ wherein systems or networks attempting to communicate with one another may utilize differing data protocols.

With continued reference to FIG. 1, transmission data may include a data packet. A "data packet" for the purposes of this disclosure is a unit of data carried from one device to another over a communication network 132. In one or more embodiments, data packet may include the payload, the header information, routing information indicating how the data packet should be transmitted, and/or the like. In one or more embodiments, transmission data may be received from modular network interface 120 wherein transmission data may be received in the form of data packets. In one or more embodiments, transmission data may be received from a system operating on CPU 108 wherein transmission data may include a data file that requires segmentation into data packets.

With continued reference to FIG. 1, FPGA 116 is configured to receive transmission data and identify at least one logic circuit 128 from a plurality of logic circuits 128 for use in decoding transmission data. In one or more embodiments, transmission data includes header information wherein FPGA 116 may select or identify a particular logic circuit 128 based on header information. In one or more embodiments, header information may include information indicating the data protocol format in which transmission data was received. In one or more embodiments, FPGA 116 may select at least one logic circuit 128 pertaining to the particular data protocol in order to decode transmission data. For example, and without limitation header information may indicate that transmission data was received in a Link-16 protocol wherein logic circuit 128 associated with Link-16 protocol may decode transmission data. In one or more embodiments, FPGA 116 may identify at least one logic circuit 128 for transmission data by identifying header information with transmission data. In one or more embodiments, a separate logic circuit 128 may be used to parse header information. In one or more embodiments, when a particular data packet and/or transmission data is detected, the appropriate logic circuit 128 is triggered for decoding. In one or more embodiments, once the header information is parsed and the specific data protocol is identified, FPGA 116 dynamically routes transmission data to the appropriate logic circuit 128 suitable for decoding transmission data.

With continued reference to FIG. 1, FPGA 116 is configured to decode transmission data. "Decoding" for the purposes of this disclosure refers to the process of interpreting encoded data and extracting any relevant information from the encoded data. In one or more embodiments, decoding may include header extraction wherein a decoder, such as a logic circuit 128, may isolate the der portion of the data packet and identify protocols, source addresses, destination addresses and/or the like. In one or more embodiments, FPGA 116 may be configured to decode transmission data by utilizing one or more logic circuits 128 configured to decode transmission data. In one or more embodiments, decoding may include a processor of protocol matching wherein a logic circuit 128 may identify a protocol within transmission data and identify a logic circuit 128 configured specifically to process those data protocols. In one or more embodiments, a process of decoding may further include a process of isolating the header information from the payload. In an embodiment, the payload may contain the actual file data while the header information includes metadata of the actual file. In one or more embodiments, a process of decoding may include using length fields within header information to determine how much data should be extracted from the payload. In one or more embodiments, a process of decoding may include error handling. In one or more embodiments, a process of decoding may include interpreting the payload based on the rules as defined by the relevant data protocol. In one or more embodiments, a process of decoding may further include preparing the data packet and/or transmission data for transmission to another device. For example, and without limitation, transmission data may be routed to CPU 108 following extraction of the payload. In one or more embodiments, decoding may further include encoding transmission data to another data protocol based on the destination address listed within the header information. In one or more embodiments, one or more logic circuits 128 may identify target protocol and convert transmission data to a data protocol similar to that of target protocol.

With continued reference to FIG. 1, in one or more embodiments decoding transmission data may include converting transmission data from a first data protocol to a second data protocol. In one or more embodiments, the first data protocol and the second data protocol may differ. In one or more embodiments, FPGA 116 may serve as a bridge between two disparate systems or networks. In one or more embodiments, one or more logic circuits 128 may be configured to convert transmission data from one data protocol to another. In one or more embodiments, a process of converting transmission data may include changing header information to match the target protocol and/or modifying or interpreting transmission data according to the rules of new protocol. In one or more embodiments, a first logic circuit 128 may be configured to decode transmission data from a first data protocol and a second logic circuit 128 may be configured to encode transmission data following the rules of the target protocol. In one or more embodiments, logic circuit 128 may be configured to reformat data structures, modify field sizes or data types, implement specific encoding or compression formats as defined by the new or second data protocol and/or the like. In one or more embodiments, a first logic circuit 128 may identify the source protocol within header information, wherein the first logic circuit 128 may route transmission data to the appropriate logic circuit 128 used for conversion of the transmission data having the particular data protocol.

With continued reference to FIG. 1, FPGA 116 may contain routing tables in order to determine a data protocol associated with the destination of transmission data. In one or more embodiments, routing tables may map destination addresses to specific protocols. For example, and without limitation, routing to CPU 108 may require a specific data protocol while routing to GPU may require a differing data protocol. In one or more embodiments, FPGA 116 may be configured to receive transmission data in a plurality of differing data protocols yet be configured to convert transmission data to a particular protocol based on its destination. In one or more embodiments, FPGA 116 may be configured to receive a predetermined set of data protocols wherein FPGA 116 may be pre-coded to convert said data protocols to a specific format. In one or more embodiments, based on the communication network 132 and/or network interface device in which transmission data was received through, transmission data may be received in a particular data protocol. In one or more embodiments, one or more logic circuits 128 may be configured to convert transmission data from one data protocol into another data protocol suitable for CPU 108 to understand.

With Continued reference to FIG. 1, FPGA 116 may be preprogrammed to output or route data using a specific data protocol. In one or more embodiments, FPGA 116 and/or logic circuits 128 may identify data protocols of incoming data, such as transmission data and convert the incoming data to a particular and prespecified data protocol. In one or more embodiments, the prespecified protocol may be one that is understood by CPU 108 and/or other components of hardware apparatus.

With continued reference to FIG. 1, FPGA 116 may be configured to communicate with a virtual network interface. A "virtual network interface" for the purposes of this disclosure is a virtual representation of a physical network which allows virtual machines, containers or other isolated environment to connect to an external network. In one or more embodiments, virtual networks may serve as a bridge between physical networks and isolated environments. In one or more embodiments virtual network interfaces allow for isolated environments, such as operating environment (as described in this disclosure) to communicate with physical networks. In one or more embodiments, a virtual network interface may emulate the behavior of a physical network interface card. In one or more embodiments, each isolated environment and/or operating environment may contain its own virtual network interface. In one or more embodiments, one or more virtual machines and/or operating environments operating on CPU 108 may include and/or communicate with a virtual network interface. In one or more embodiment, virtual network interface may include a virtualized network device that is used to forward packets based on flow rules or routing traffic between different network segments. In one or more embodiments, virtual network device may operate on a server, wherein the server acts as a forwarding engine, analyzing header information and forwarding or routing them based on policies and flow rules. In one or more embodiments, virtual network device may be used to identify information that is being transmitted through a network and/or from operating environments.

With continued reference to FIG. 1, FPGA 116 may be configured to transmit or route transmission data to a virtual network interface. In one or more embodiments, one or more operating environments may be communicatively connected to the virtual network interface. In one or more embodiments, FPGA 116 may be configured to convert transmission data from one data protocol to another FPGA 116 may be configured to route transmission data through the virtual network interface using the policies or data protocols of the virtual network interface. In one or more embodiments, FPGA 116 may communicate with a hypervisor in order to route transmission data to one or more virtual environments.

With continued reference to FIG. 1, FPGA 116 may be configured to convert transmission data in order to route transmission data through a dedicated communication protocol. A "Dedicated communication protocol" for the purposes of this disclosure refers to a set of rules designed for specific communication tasks between systems. In one or more embodiments, dedicated communication protocol may include a data protocol configured specifically for communication between FPGA 116 and CPU 108, FPGA 116 and modular network interface 120, FPGA 116 and first processor core and/or the like. In one or more embodiments, dedicated communication protocol may include a data protocol preselected by an individual for use within transmission received by FPGA 116. In one or more embodiments, dedicated communication protocols may include a set communication standard between two devices or systems. In one or more embodiments, dedicated communication protocols may include communication between physical Buses, communication between specific serial interfaces, communication between high-speed serial protocols, and/or the like. In one or more embodiments, dedicated communication protocol may include a data protocol configured specifically for a software operating on CPU 108. In one or more embodiments, FPGA 116 may route data to a dedicated communication protocol wherein the dedicated communication protocol is configured exclusively to transfer data between FPGA 116 and another component of hardware apparatus. This may include, but is not limited to, the use of digital signals, the use of data packets, the use of memory-mapped data and/or the like. In one or more embodiments, dedicated communication protocol may include any preestablished data protocol between two or more components within hardware apparatus 100.

With continued reference to FIG. 1, FPGA 116 and/or logic circuits 128 may be programmed and/or configured to serve as a network controller. A "network controller" for the purposes of this disclosure refers to a system responsible for observing or controlling the behavior of one or more communication networks 132. In one or more embodiments, network controller may receive data that is ready for transmission and make routing decisions based on the state of current networks that are available. In one or more embodiments, network controller may dictate policies for a particular communication network 132. In one or more embodiments, network controller may monitor network traffic, utilization, bandwidth security issues and/or the like.

With continued reference to FIG. 1, network controller may be configured to identify network devices on one or more communication networks 132. In one or more embodiments, network controller may identify a particular communication network 132 in which transmission data may be routed through. A "network device" for the purposes of this disclosure is a computing device and/or physical or virtual component thereof that is communicatively connected to system by a network connection. In one or more embodiments, network device may enable communication between a computing device and a communication network 132. In one or more embodiments, network devices may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may allow computing device to communicate through a communication network 132. In one or more embodiments, network device may include network interface device as described above. In one or more embodiments, network controller may identify network devices in order to determine a particular communication network 132 and/or path for transmission data. In one or more embodiments, network controller may utilize a link layer discovery protocol (LLDP) in order to identify network devices on or more communication networks 132. "Link layer discovery protocol" as described in this disclosure refers to a network discovery protocol that is used to detect neighboring network devices in a network. In one or more embodiments, network controller may dynamically discover devices by identifying LLDP messages that have been transmitted from said devices. In one or more embodiments, network controller may identify network devices on communication network 132 through discovery protocols such as but not limited to, openflow, simple network management protocol, network agents operating on network devices, through application program interfaces and/or the like. In one or more embodiments, network controller may be configured to identify virtual networks operating on CPU 108. In one or more embodiments, network controller may identify network switches, virtual switches, virtual network interfaces, overlay networks and/or the like, wherein network controller may communicate with the virtual devices. In one or more embodiments, network devices may automatically transmit communications, wherein network controller may receive communications and identify network device.

With continued reference to FIG. 1, network controller may further include one or more software defined intelligent networking (SDIN) systems. "Software defined network" (SDN) for the purposes of this disclosure is a system in which virtual networks can be created to direct traffic on a network. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers or operating environments. Software containers may be limited in network resources due to their level of importance; such that less important software containers do not crowd a network for less important matters. "Software defined intelligent network" (SDIN) for the purposes of this disclosure. is an SDN which utilizes artificial intelligence and machine learning to optimize the performance of a network. In SDIN, machine learning may be used to predict issues, predict network demands and adjust the network accordingly. In some cases, SDIN may be used to ensure that software containers or operating environments do not interact with one another. An SDIN controller may be used to interact with a network. The SDIN controller may monitor network traffic and make decision to optimize traffic for software container. In one or more embodiments, SDIN may ensure enable dynamic mesh networks, and facilitate assured, secure data sharing across Link-16, BFT, 4586, and RAC2.

With continued reference to FIG. 1, network controller may identify network devices by transmitting one or more discovery requests. A "discovery request" for the purposes of this disclosure refers to a transmission or request made by network controller to identify available network devices on one or more communication networks 132. For example, and without limitation, network controller may transmit a broadcast to announce its presence and seek information from other network devices. In one or more embodiments, discovery request may include a request to receive information from other network devices on communication networks 132. In one or more embodiments, network devices may respond to discovery request with information about capabilities, configuration, status and/or the like. In one or more embodiments, discovery request may include a request for information such as but not limited to, a device types, the services offered, the capabilities (e.g. bandwidth, protocols supported, whether the network is active or idle and/or the like. In one or more embodiments, network devices that receive discovery request may transmit information such as, but not limited to, a device identifier, services offered, configuration details and/or the like. In one or more embodiments, network controller may identify network devices based on responses given to discovery requests. In one or more embodiments, network controller may support multiple network protocols or discovery protocols simultaneously in order to identify network devices on disparate networks. In one or more embodiments, processor and/or network controller may be configured for multiple protocols through software configuration and/or virtualization. In one or more embodiments, network controller may include a virtual network controller, wherein the virtual network controller includes a virtualized software emulating a network controller. In one or more embodiments, virtual network controller may transmit discovery requests based on the network type it is addressing. For example, and without limitation, a particular discovery request may be made for a radio network and a differing discovery request may be made for an ethernet based network.

With continued reference to FIG. 1, FPGA 116 and/or network controller may be configured to identify a congestion datum. A "congestion datum" for the purposes of this disclosure refers to information about the performance or availability of a communication network 132. In one or more embodiments, congestion datum may include latency measurements, wherein latency measurement includes the time it takes for data packets to travel between two points in a network. In one or more embodiments, congestion datum may include throughput analysis wherein network controller may identify the amount of data being transmitted over a network segment. In one or more embodiments, congestion datum may include packet loss wherein congestion datum may include the number of packets being lost. In an embodiment, packet loss may indicate that a network may be congested. In one or more embodiments, congestion datum may include utilization, wherein utilization may indicate the bandwidth usage across a network. In an embodiment, if utilization is consistently high, then the network may be configured. In one or more embodiments, congestion datum may be used to evaluate the performance of a network and whether it is suitable for transmission of transmission data. In one or more embodiments, congestion datum may indicate if a network is active and capable of sending and/or receiving transmission. In one or more embodiments, congestion datum may include error rates, wherein error rates indicate packet loss and error rates when transmitting information. In one or more embodiments, discovery request may include a request to receive information associated with congestion datum wherein network devices responding to network request may provide congestion datum. In one or more embodiments, network controller may make an SNMP request to receive information such as CPU 108 load, memory usage and/or the like. In one or more embodiment, discovery request may be transmitted to a plurality of network devise wherein network devices may respond with congestion datum and/or a portion thereof. In one or more embodiments, network controller may identify congestion datum by attempting to transmit information through a particular network device and/or communication network 132. In an embodiment, network controller may calculate various elements of congestion datum by transmitting data packets and monitoring receipt of the data packets.

With continued reference to FIG. 1, congestion datum 148 may further include a various security status of each network device 146. For example, and without limitation, network devices may transmit whether they contain firewalls, built in security mechanisms to monitor vulnerabilities, intrusion detection mechanisms, firmware integrity checks and/or the like. In one or more embodiments, congestion datum 148 may include a security status of each network device wherein each network device may report how secure the network device is. In one or more embodiments, network device may report that they support secure communication protocols, they are compatible with various security measures, that they have monitoring systems for threat detection and/or the like. In one or more embodiments, congestion datum 148 may include these security features wherein network controller may select network devices based on the security requirement of transmission data 118. For example, and without limitation, transmission priority and/or metadata may indicate that transmission data may only be transmitted through secure and/or encrypted networks wherein congestion datum 148 may indicate which network devices adhere to any requirements posed by transmission data 118. In one or more embodiments, congestion datum may further include connected device to network device wherein processor may determine if a path exists if network device is connected to other network devices. In one or more embodiments, processor may be configured to query a single network device, wherein processor may receive a list of network device connected to the single network device. In one or more embodiments, discovery protocols such as link layer discovery protocols, cisco discovery protocols, simple network management protocols and/or the like may be used to query a first device and request all devices connected to the first device. In one or more embodiments, processor may then be configured to query all devices connected to the first network device in order to determine the most suitable second network device. In one or more embodiments, processor may use discovery request to determine all network devices on a network and all subsequent network devices connected to the first set of network devices and so on until a map is created from a source to a destination. In one or more embodiments, processor may be configured to receive a plurality of network devices wherein multiple sets of network devices connected to one another from a source to a destination may be discovered. In one or more embodiments, congestion datum may be used to identify subsequent network devices connected to a first network device and additional network devices connected to the subsequent devices, thereby forming a path of network devices from a source to a destination. In one or more embodiments, processor may be configured to identify congestion datum 148 for all network devices identified in order to determine routing path 152.

With continued reference to FIG. 1, FPGA 116 is configured to route transmission data. In one or more embodiments, routing transmission data may include routing encoded or decoded transmission data. In one or more embodiments, FPGA 116 may first encode or decode transmission data prior to routing of transmission data. In one or more embodiment, a processor of routing transmission data may include a processor transmitting transmission data from FPGA 116 to another component or software associated with hardware apparatus. For example, and without limitation, FPGA 116 may route transmission data to CPU 108, wherein CPU 108 may processor transmission data for use in one or more operating systems. In one or more embodiments, FPGA 116 may route transmission data using one or more physical Buses in order to directly communicate with CPU 108 or other components of hardware apparatus. In one or more embodiments, CPU 108 may contain a plurality of processing cores 110, wherein FPGA 116 may be configured to route transmission data to at least one processing core 110 of the plurality of processing cores 110. In one or more embodiments, each processing core 110 of a plurality of processing cores 110 may be allocated for a particular virtual machine, for a particular isolated virtual environment and/or the like. In one or more embodiments, FPGA 116 may be configured to route transmission data to the processing core 110. In one or more embodiments, FPGA 116 may be configured to route decoded transmission data to the processing core 110. In one or more embodiments, FPGA 116 may identify a destination address within header information of transmission data and route transmission data as a function of the destination address.

With continued reference to FIG. 1, a process of "encoding" a datum as described in this disclosure may include any steps or inverse of steps used to decode a datum as described in this disclosure. For example, and without limitation, FPGA 116 may be configured to encode transmission data 118 wherein FPGA may receive transmission data, create data packets, create header information and/or the like. In one or more embodiments, a process of encoding transmission data may include converting transmission data from one data protocol to another. In one or more embodiments, a process of encoding transmission data may include modifying transmission data in order to make transmission data suitable for a particular data protocol and/or network device. In one or more embodiments, FPGA may encode transmission data by receiving a data file, segmenting the data file into packets and/or preparing data files based on the rules provided by the data protocol. In one or more embodiments, a process of encoding may include modifying signals to be transmitted, converting signals from analog to digital and/or the like.

With continued reference to FIG. 1, one or more logic circuits may be configured to convert transmission data 118 from an analog format to a digital format. In one or more embodiments, transmission data may be received by a radio communication and/or an analog device, wherein transmission data may be received in an analog format. In one or more embodiments, one or more logic circuits may be configured to identify a format of transmission data and convert transmission data from an analog format to a digital format and/or a digital format to an analog format. In one or more embodiments, a finite impulse response (FIR) filter and/or an infinite impulse response (IIR) filter may be implemented on FPGA. In one or more embodiments, FPGA may be configured for adaptive filtering wherein adaptive filters such as least mean squares or recursive least square algorithms may be used to for adaptive filters. In one or more embodiments, FPGA 116 may be configured to noise processing wherein FPGA can implement on or more noise reduction algorithms such as wiener filters or Kalman filters to dynamically adjust noise levels within a transmission. In one or more embodiments, FPGA 116 may be configured to perform fast Fourier transform and inverse fast Fourier transforms for transmission data 118.

With continued reference to FIG. 1, FPGA 116 may be configured to route transmission data and/or decided transmission data to and/or through modular network interface 120. In an embodiments, FPGA 116 may receive transmission data through a first network device within modular network interface 120 connected to a first communication network 132 and route transmission data to a second network device within modular network interface 120 connected to a second communication network 132. In one or more embodiments, FPGA 116 may be configured to receive transmissions from a first communication network 132, convert the transmissions and route the transmission through a second communication network 132. In one or more embodiments, FPGA 116 and/or hardware apparatus 100 may serve as a participating node for within a communication network 132. A "participating node" for the purposes of this disclosure refers to a device, such as a network device as described above, that participates in the communication process between two systems or networks. In one or more embodiments, participating nodes may be responsible for the transmission of transmission data. In one or more embodiments, participating nodes may include networks, devices, network devices and/or remote devices that can receive, store and transmit transmission data. In one or more embodiments, virtual environments may be located on a device with sporadic and/or intermittent network connections wherein transmission data may be transmitted across participating nodes until they arrive at their final destination. In one or more embodiments, FPGA 116 and/or network controller a may be configured to determine a route along one or more participating nodes between a source node and a destination node. In one or more embodiments, the source node may include the source of the transmission of transmission data. In one or more embodiments, the source node may include the first participating node in a sequence of nodes and/or the initial location of transmission data. In one or more embodiments, the destination node includes the final destination of transmission data. In one or more embodiments, the destination node may include the last participating node in a sequence of nodes and/or the final destination of transmission data. In one or more embodiments, FPGA 116 and/or network controller may be configured to determine or identify a routing path for transmission data wherein FPGA 116 may receive transmission data and route transmission data to the next participating node. In one or more embodiments, hardware apparatus 100 may serve as a single participating node with a plurality of participating nodes from a source to a destination. In one or more embodiments, FPGA 116 may be configured to receive transmission data and transmit transmission data to the next participating node with a network. In one or more embodiments FPGA 116 may be configured to identify a node path in order to route transmission data. A "node path" for the purposes of this disclosure is a route for transmission data to travel along in order to be transmitted from a source node to a destination mode. For example, and without limitation node path may include a plurality of participating nodes in which transmission data may be transmitted through multiple participating nodes until the transmission data has reached the final destination (e.g., a particular device) and/or destination node. In one or more embodiments node paths may indicate a set of participating nodes in which transmission data may be transferred to and from until transmission data has reached a final destination.

With continued reference to FIG. 1, FPGA 116 may be configured to receive transmission data from one network device and route transmission data to another network device, such as from a first portable ground control station of a plurality of ground control stations to a second ground control station of a plurality of ground control stations, as described above. In one or more embodiments, FPGA 116 may serve as a bridge between two communication networks 132 and/or network devices. In one or more embodiments, FPGA 116 may receive transmission data, identify a destination address and route transmission data as a function of the destination address. In one or more embodiment FPGA 116 may serve as a node, wherein FPGA 116 may be configured to receive transmissions from a communication network 132 and route the transmissions to other devices. In one or more embodiments, FPGA 116 may be configured to implement various data protocols to facilitate the routing of data from one component of hardware apparatus to another. In one or more embodiments, FPGA 116 may be configured to listen or identify for incoming packets, parse the header information for relevant information, repackage the information into a suitable format and transmit the information through another network interface. In one or more embodiments, FPGA 116 may be used to facilitate the transfer of transmission data through disparate network devices.

With continued reference to FIG. 1, FPGA 116 may be configured to communicate with one or more operating environments. In one or more embodiments, FPGA 116 may be configured to route transmission data to one or more operating environment. An "operating environment" for the purposes of this disclosure refers to the combination of hardware and software that allows a computer software to function or execute. For example, and without limitation, operating environment may include an operating system, device drivers, virtual machines, software containers, software modules, executable programs and the like. In one or more embodiments, operating environment may allow for the execution of computer software. In one or more embodiments, operating environments may allow for the execution of software modules and/or software containers. Software container may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems, electronic flight bag (EFB) software, ground support equipment software, weather forecasting and reporting software, cockpit display rendering software, and/or the like. In some cases, software image may include a virtual machine image that encapsulates a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container. In one or more embodiments, any data and/or information within software container may be used to ensure proper execution of software module. In one or more embodiments, software container may contain libraries, dependencies, and the like to ensure proper execution of software module. In one or more embodiments, software module may include an executable file. In one or more embodiments, software module may include third party applications wherein $3^{rd}$ party applications may include software and/or application created and/or managed by a differing entity. In one or more embodiments, software module may include previously developed applications wherein the previously developed applications are modified to interact with a particular environment. In one or more embodiments, software container may allow for a third-party application and/or previously developed application to be deployed within multiple virtual environments and/or operating system. In one or more embodiments, software module may include a previously developed application and/or $3^{rd}$ party application wherein software module may be placed within software container to allow for software module to operate within multiple environments. A "software container" for the purposes of this disclosure is an executable package that is capable of running software within an isolated space. For example, and without limitation, software container may include a document drafting software wherein the software container may contain any information, runtime environment and the like necessary to execute the document drafting software on more than one operating system. In one or more embodiments, software containers may create a virtualized environment wherein a software may run within the virtualized environment. In one or more embodiments, operating environment may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS virtualization wherein a software may be isolated from a host operating system while still sharing the host operating system kernel. An "Operating system (OS) level virtualization," for the purposes of this discourse is a system in which an operating system kernel allows the existence of multiple isolated environments. In OS virtualization, a software within software container may not have access to resources of the host operating system. Instead, the software may only have access to the contents within software container. In one or more embodiments, operating environment may include a host operating system. A "host operating system" for the purposes of this disclosure is a primary operating system running on processor. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor. In one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to application and/or software code, dependencies, runtime components needed to execute the application such as access to a database, and the like. In one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on an operating environment with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools.

With continued reference to FIG. 1, FPGA 116 may communicate with operating environment through a hypervisor. A "hypervisor" for the purposes of this disclosure is a software module which is configured to create and manage virtual machines. In one or more embodiments, hypervisor may create one or more virtual machines wherein each virtual machine may host a separate and isolated operating environment. In one or more embodiments, each virtual environment may contain a separate and isolated operating system. In one or more embodiments, a hypervisor may run on the host operating system wherein the hypervisor may generate virtual machines on the host operating system. In one or more embodiments, a hypervisor may run directly on the hardware of a computing device without reliance on an operating system. In one or more embodiments, a hypervisor hat runs independent of a host operating system may be referred to as a "Type 1" and/or "bare metal" Hypervisor. In one or more embodiments, in a bare metal hypervisor, the hypervisor is directly installed on the hardware of computing device hardware apparatus 100 rather than through the operating system. In one or more embodiments, a type 1 hypervisor may have partition resources, such as memory processing power and the like for each virtual machine. In one or more embodiments, virtual machines may communicate directly with the hardware of hardware apparatus 100 rather than the host operating system. In one or more embodiments, in a bare metal hypervisor virtual machines are not susceptible to issues caused by the host operating system and/or other virtual machines. In one or more embodiments, virtual machines may be isolated and unaware that other virtual machines exist. In one or more embodiments, a bare metal hypervisor may allow for increased performance wherein virtual machines may communicate directly with hardware rather than through the intermediate host operating system. In one or more embodiments, a bare metal hypervisor may allow multiple virtual machines to run simulates wherein failure of one virtual machine may not result in a failure of a second virtual machine. In one or more embodiments, in a type 2 hypervisor, partitioning and resource allocation may occur above the host operating system layer, whereas in a type 1 hypervisor partitioning may occur below the host operating system and directly with the hardware of computing device. In one or more embodiments, in a type 2 hypervisor, virtual environments or operating environments may rely on the host operating system for proper resource allocation and memory allocation whereas in a type 1 hypervisor, virtual environments may only rely on the hardware.

With continued reference to FIG. 1, a virtualization layer may be supervised by hypervisor, wherein a host operating system within virtual environment is operated by the virtualization layer. As used in this disclosure, a "virtualization layer" is a software layer (or interface) that sits between hardware layer (e.g., physical CPU 108, memory, I/O devices, and/or the like) and virtual environment having one or more virtual machines. In some cases, virtualization layer may be configured to virtualize the underlaying hardware resources and present the virtualized hardware resources to plurality of virtual machines as though they are dedicated to each virtual machine. In a non-limiting example, a plurality of partitions of a single physical hardware component as described herein may share the same physical hardware resources through virtualization layer, without being aware of each other. In some cases, virtualization layer may be instantiated when hypervisor is booted or launched. In a non-limiting example, in case of a type 1 hypervisor, virtualization layer may be generated when machine starts up since hypervisor directly interface with hardware. In some cases, virtualized resources may be allocated based on partition policy as described in detail below. In some cases, hypervisor may manage the scheduling of virtual machines tasks on actual cores. In some cases, hypervisor may handle interruptions, exceptions, and any events that occur, deciding which virtual machines or service needs attention. In some cases, hypervisor may be configured to isolate one or more virtual machines from rest of virtual machines to maintain system security and stability. In other cases, hypervisor may be configured to manage lifecycle operations of one or more virtual machines such as, without limitation, creation, modification, deletion, migration, and/or the like.

With continued reference to FIG. 1, FPGA 116 may communicate with operating environments through Hypervisor. In one or more embodiments, FPGA 116 may serve as a virtual network wherein FPGA 116 may route transmission data to operating environments in the form of a virtual network. In one or more embodiments, FPGA 116 may be configured to emulate a virtual network interface card. In one or more embodiments, virtual network interface card may be consistent with virtual network interface as described above. In one or more embodiments, FPGA 116 may communicate with operating environments though virtualization layer wherein operating environments may communicate with a virtual network in order to send and/or receive information from modular network interface 120. In one or more embodiments, hypervisor may instantiate the virtual network interface card wherein operating systems operating on hypervisor may communicate to FPGA 116 through virtual network interface card. In one or more embodiments, FPGA 116 may route data through hypervisor and/or virtualization layer similar to a process in which data is transmitted through a network. In one or more embodiments, operating environments may communicate with virtual networks wherein FPGA 116 may serve as the intermediary between operating environments and the communication networks 132. In one or more embodiments, FPGA 116 may be configured to send and/or receive data in a particular data protocol format and convert the data based on the destination. In one or more embodiments, FPGA 116 may communicate with one or more virtual network interfaces wherein FPGA 116 may adhere to the protocols of the virtual network interfaces. In one or more embodiments, FPGA 116 may communicate with operating environments through virtualization layers, hypervisor virtual network interfaces and/or the like. In one or more embodiments, FPGA 116 may communicate with one or more operating environments through a virtual network interface.

With continued reference to FIG. 1, FPGA 116 may be configured to receive data through modular network interface 120 and send data through modular network interface 120. In one or more embodiments, FPGA 116 may be configured to receive transmission data from one or more components of hardware apparatus and route transmitting to or through one or more components of hardware apparatus 100. For example, and without limitation FPGA 116 may receive transmission data from a first processing core 110, from an operating environment from a first instruction set and/or the like, encode or decode transmission data and route transmission data through modular network interface 120 and to one or more communication networks 132. In one or more embodiments, FPGA 116 may receive transmission data and encode transmission data for transmission or decode transmission data for transmission. In one or more embodiments, FPGA 116 may be configured to receive transmission data in the form of data packets, a regular data file and the like and encode or decode transmission data for routing through modular network interface 120. In one or more embodiments, FPGA 116 may include logic circuits 128 configured to encode transmission data for a particular data protocol associated with modular network interface 120. In one or more embodiments, FPGA 116 may receive transmission data from a virtual network interface, encode or decode transmission data, and route transmission data through modular network interface 120. In one or more embodiments, FPGA 116 may receive transmission data from one or more processing cores 110 and route transmission data through modular network interface 120. In one or more embodiments, FPGA 116 may receive transmission data through a dedicated communication protocol. In one or more embodiments, FPGA 116 may convert transmission data from one data protocol to another prior to routing through modular network interface 120. In one or more embodiments, FPGA 116 may receive transmission data through modular network interface 120 and route through modular network interface 120. In one or more embodiments, FPGA 116 may be configured to receive transmission data from allocated processing cores 110 through a virtual network interface.

With continued reference to FIG. 1, FPGA 116 may be configured to identify one or more communication networks 132 available through modular network interface 120. In one or more embodiments, FPGA 116 may act as network controller, wherein FPGA 116 may identify available communication networks 132. In one or more embodiments, an available communication network 132 includes a communication network 132 that is capable of transmitting transmission data. In one or more embodiments, FPGA 116 may identify one or more available communication networks 132 communicatively connected to modular network interface 120. In one or more embodiments, FPGA 116 may route transmission data through one or more available communication networks 132 based on congestion datum as described above. In one or more embodiments, FPGA 116 may identify an available communication network 132 through discovery requests, through identification of data packets on communication networks 132, through data received from communication networks 132 and/or the like. In one or more embodiments, FPGA 116 may identify a data protocol associated with at least one available communication network 132. In one or more embodiments, FPGA 116 may modify transmission data to adhere to the data protocols of communication network 132. In one or more embodiments, FPGA 116 may then be configured to route modified transmission data through communication network 132. In one or more embodiments, FPGA 116 may be configured to route the transmission data to from a first portable ground control station to a second portable ground control station of the plurality of portable ground control stations.

Still referring to FIG. 1, in some embodiments, multiple processing cores 110 may be allocated to implementing a single program instruction set 136. In some embodiments, GPU cores and CPU 108 cores may both be used to implement a single program instruction set 136. This may be enabled, for example, by an API described herein. In a non-limiting example, a GPU may include a first plurality of cores, a CPU 108 may include a second plurality of cores, apparatus 100 may receive a program instruction set 136, and apparatus 100 may allocate a first core from the first plurality of cores and a second core from the second plurality of cores to the program instruction set 136. In some embodiments, such a program instruction set 136 may be stored in local memory. In some embodiments, such a program instruction set 136 may be received from an external device. In some embodiments, apparatus 100 may be partitioned such that such a program instruction set 136 operates on a separate partition from other programs. In some embodiments, apparatus 100 may run a virtual environment and/or operating system on a set of cores and memory allocated to program instruction set 136. In some embodiments, cores and/or memory allocated to program instruction set 136 may be connected selectively through an FGPA. This may prevent, for example, access of memory allocated to program instruction set 136 by a nonsecure program.

With continued reference to FIG. 1, hardware apparatus may be configured to receive a program instruction set 136 and allocate processing cores 110 from the CPU 108 and GPU for the first program instruction set. In one or more embodiments, the first program instruction set may include an operating environment, a virtual machine and/or the like as described in this disclosure. In one or more embodiments, first program instruction set may include instructions configuring the CPU 108 to allocate processing cores 110 from CPU 108 and CPU 108 for implantation of an operating environment. In one or more embodiments, hardware apparatus may be configured to receive a first program instruction set and allocate a first processing core 110 from a first plurality of processing cores 110 and a second processing core 110 from the second plurality of processing cores 110 to the first program instruction set. In one or more embodiments, the first plurality of processing core 110 may include processing cores 110 associated with CPU 108. In one or more embodiments, the second plurality of processing cores 110 may include processing cores 110 associated with GPU. In one or more embodiments, hardware apparatus may be configured to receive an addition and/or second program instruction set and allocate a third processing core 110 from the first plurality of processing cores 110 and a fourth processing core 110 from the second plurality of processing cores 110 to the second program instruction set. In one or more embodiments, hardware apparatus may be configured to receive a plurality of program instruction sets and allocate processing cores 110 from CPU 108 and GPU for each program instruction set.

With continued reference to FIG. 1, program instruction sets may include virtual environments, virtual machines, operating environments and/or the like. In one or more embodiments, FPGA 116 may be configured to transmit transmission data to each instruction set and/or to the allocated processing cores 110 of each instruction set. In an embodiment, FPGA 116 may be configured to route transmission data from operating environments and/or program instructions to network devices such as modular network interface 120.

With continued reference to FIG. 1, hardware apparatus may further include one or more display ports. "A display port" for the purposes of this disclosure is a digital connection used to communicate audio and/or video between two devices. For example, and without limitation, display port may be used to connect a display device to hardware apparatus. Examples of a display device include, but are not limited to, a liquid crystal display (LCD), a cathode ray tube (CRT), a plasma display, a light emitting diode (LED) display, and any combinations thereof. In one or more embodiments, display port may allow for a communicative connection between display device and hardware apparatus. In one or more embodiments, display port may include port types such as but not limited to, DisplayPort, VGA, HDMI, DVI, usb-c, thunderbolt and/or the like. In one or more embodiments, display port may allow for visualization of information contained within program instruction set and/or an operating environment associated with program instruction set. In one or more embodiments, hardware apparatus may include two display ports wherein a first display port configured is to receive a first datum from the first instruction set and route the first datum to a first display device and a second display port configured to receive a second datum from the second instruction set and route the second datum to a second display device. In one or more embodiments, each display port may be configured for a separate operating environment, a separate allocation of processor cores and/or the like. In one or more embodiments, each display port may be isolated from other display ports wherein a first display port may be configured to exclusively display datum from a first program instruction set and a second display port may be configured to exclusively display datum from a second instruction set.

Figure 2:
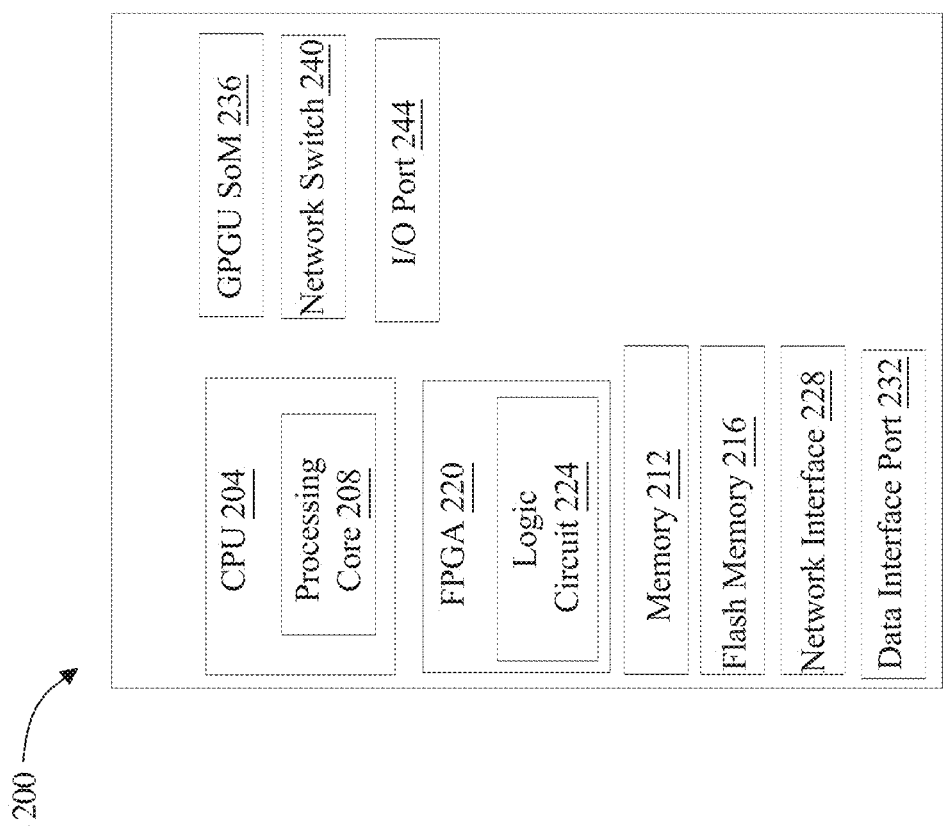
FIG. 2 is a block diagram of an edge computer.

Referring now to FIG. 2, a block diagram of an exemplary embodiment of an edge computer 200 is described. An "Edge computer" as described in this disclosure refers to a computing device that processes data near the source of generation rather than relying on a central processor. For example, without limitation, edge computer may be configured to receive network communication and process the network communications without the need for a central operating system or processor. In one or more embodiments, edge computer 200 may allow for processing of data prior to receipt by a central operating system. In one or more embodiment, edge computer 200 may allow for the processing of data directly from sensors, IOT devices, communication from network devices and/or the like. In one or more embodiments, use of an edge computer may reduce latency wherein data can be transmitted directly to a processing unit for analyzation. In one or more embodiments, edge computer may be used to process signals, send and receive communications, processor communications, support network virtualization and/or the like. In one or more embodiments, an edge computer may serve as a network controller (as described in reference to FIG. 2). In one or more embodiments, edge computer 200 may be configured to handle data protocols, convert data unpackage data and/or the like. In one or more embodiments, edge computer 200 may perform one or more processes tasked by FPGA as described in reference to FIG. 2.

With continued reference to FIG. 2, Edge computer 200 may be configured to decouple network functions, wherein network functions can be deployed on edge devices such as routers, gateways dedicated server and/or the like. In one or more embodiments, various network functions may be immediately processed by edge computer rather than by a central processor. In one or more embodiments, edge computer 200 may be responsible for monitoring local traffic, responsible for routing transmissions, responsible for encoding and decoding transmission and/or the like. In one or more embodiments, edge computer may serve as an intermediary between a network or network device and a central processor or operating system. In one or more embodiments, data may be encoded or decoded prior to receipt by the operating system. In one or more embodiments, edge computer may be configured to receive communications from a network, such as transmission data and modify the transmission prior to receipt by one or more operating environments. In one or more embodiments, edge computer may be used as a network controller configured to manage or observe one or more networks. In one or more embodiments, edge computer may facilitate the transmission of communications between network devices and operating environments. In one or more embodiments, edge computer 200 may be configured to identify available networks, route data and/or the like for one or more operating environments. In one or more embodiments, edge computer may facilitate network slicing wherein edge computer may create multiple virtual networks in a single physical network. In one or more embodiments, use of edge computer 200 in networking may allow for reduced latency wherein transmissions are processed immediately and not once they are received by the operating system.

With continued reference to FIG. 2, edge computer may expand network capabilities wherein edge computer may serve as a bridge between one or more operating environments and one or more communication networks. In one or more embodiments, edge computer may be configured to allow for communication between operating environments and communication networks by converting data protocols and/or ensuring that data is properly modified between disparate networks. In one or more embodiments, edge computer may identify available communication networks and facilitate a communication between the operating environments and the available communication networks. In one or more embodiments, edge computer may serve as a virtual network interface wherein an operating environment may communicate with the virtual network in order to route transmission through a communication network.

With continued reference to FIG. 2, in one or more embodiments, edge computer 200 may be configured to handle or process a plurality of data protocols. In one or more embodiments, edge computer may identify header information within a transmission, identify a data protocol and decode the transmission accordingly.

With continued reference to FIG. 2, edge computer 200 may serve as an interface between two disparate devices. For example, and without limitation, edge computer 200 may facilitate communication between a sensor and a device seeking data from the sensor. In one or more embodiments, edge computer may be programmed for specific tasks such as but not limited to machine learning, sensor processing, signal processing and/or the like. In one or more embodiments, hardware apparatus (as described in reference to FIG. 1) may include edge computer 200. In one or more embodiments, edge computer may serve as an interface between modular network interface and other components of hardware apparatus. In one or more embodiments, edge computer 200 may serve as the interface between CPU 108 and other devices such as sensors and/or the like.

With continued reference to FIG. 2, Edge computer may include a CPU 204 and a plurality of processing cores 208 associated with the CPU. In one or more embodiments, CPU 204 may include an Intel® Atom® X6425RE Series processor, 4-core, 1.9 GHZ, 1.5 MB cache. In one or more embodiments, CPU may include any processing unit. In one or more embodiments, edge computer may include a memory 212. In one or more embodiments, memory 212 may include DDR4 or DDR5 memory. In one or more embodiments, edge computer may include a flash memory 216. In one or more embodiments, flash memory 216 may include eMMC 5.1.

With continued reference to FIG. 2, edge computer 200 may include FPGA chip 220. In one or more embodiments, FPGA chip 220 may include any FPGA as described in this disclosure. In one or more embodiments, FPGA chip 220 may include a plurality of logic circuits 224.

With continued reference to FIG. 2, edge computer may include a network interface 228. In one or more embodiments, network interface 228 may include 10/100/1000/2.5 Gbit Ethernet (downlink to Switch). In one or more embodiments, network interface 228 may allow for edge computer 200 to connect to one or more communication networks. In one or more embodiments, edge computer 200 may include a data interface port 232. In one or more embodiments, data interface port 232 may allow for the transmission of power or data between edge computer 200 and other devices. In one or more embodiments, data interface port 232 may include USB 2.0 ports, USB3.0 ports. USB-C ports and/or any other data transfer ports.

With continued reference to FIG. 2, edge computer 200 may include a general purpose graphics processing unit (GPGPU). In one or more embodiments, edge computer 200 may include a GPGPU system on a module (Som). In one or more embodiments, a GPGPU SOM 236 may include a hardware module that includes all the necessary components to allow for graphical processing on edge computer. In one or more embodiments, GPGPU SOM 236 may include a graphics processing unit, a memory, a processor, storage, power management and/or the like. In one or more embodiment, GPGPU SOM 236 may allow for parallel processing of various tasks. In one or more embodiments, GPGPU SoM 236 may allow for parallel processing of tasks such as data analysis, video streaming image recognition, sensor data processing and/or the like. IN one or more embodiment GPGPU SOM 236 may allow for reduced latency wherein data may be immediately analyzed at the source of generation.

With continued reference to FIG. 2, edge computer may include a network switch 240. In one or more embodiments, network switch 240 may include an L2 or L3 Switch. In one or more embodiments, edge computer 200 may include a plurality of input/output (I/O) ports 244. In one or more embodiments, I/O ports may include but are not limited to, GPS antenna ports, 5V 1 PPS inputs, 5V 1 PPS outputs, 10 MHZ sine wave outputs and/or the like.

At a high level, aspects of the present disclosure are directed to an apparatus for heterogenous processing. Apparatus may include a GPU, a CPU, a dedicated memory for the CPU, an FPGA, which may have a dedicated memory, a control and data bus assembly 140, a VPX, and one or more HSIO connections. In embodiments, apparatus may be connected to computing systems and/or local networks thereof to add processing power, support for secure operation of third-party applications, connections to peripherals, and the like. Apparatus may serve as a module in a modular computing system suitable for deployment in aircraft, land vehicles, command centers, and/or communication nodes in the field.

Figure 3:
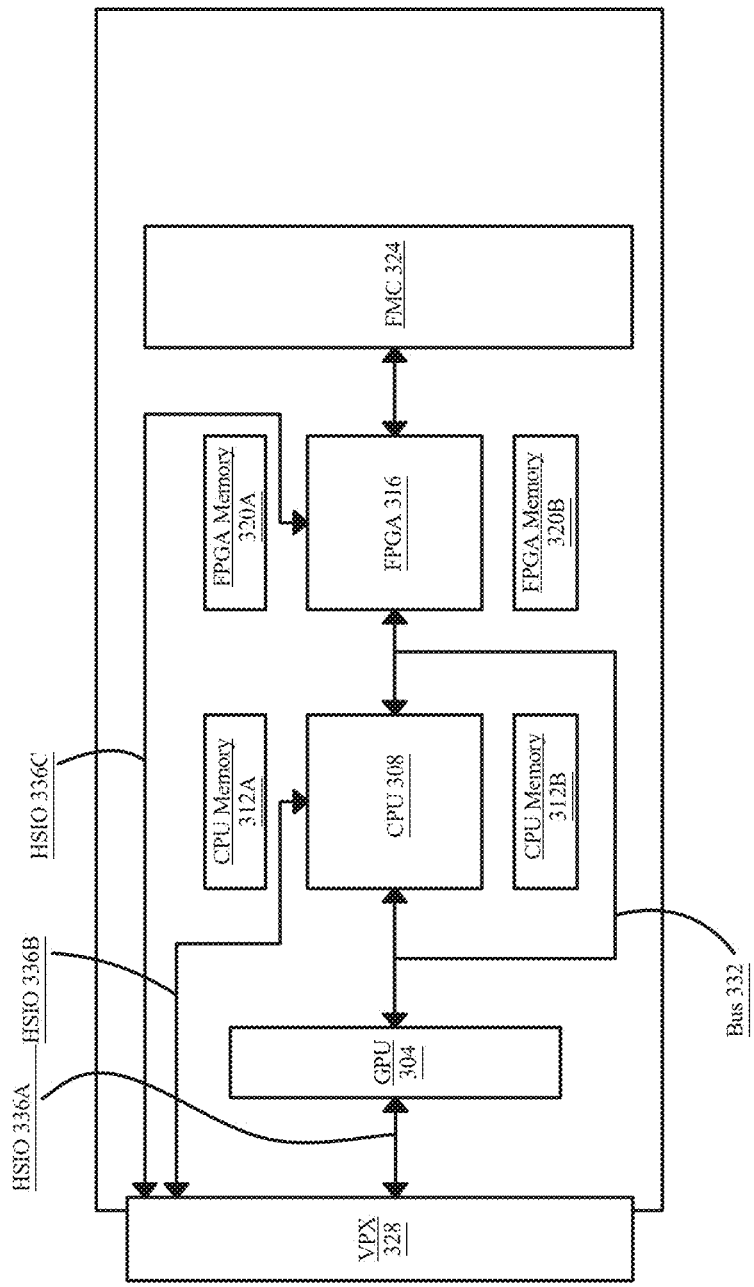
FIG. 3 is a diagram depicting an exemplary apparatus for heterogenous processing.

Referring now to FIG. 3, an exemplary embodiment of an apparatus 300 is illustrated. Apparatus 300 may include a computing device. Apparatus 300 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 3, in some embodiments, apparatus 300 may include software instructions in memory and/or may receive software instructions from an external computing device. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Still referring to FIG. 3, in some embodiments, apparatus 300 may include a Graphics Processing Unit (GPU) 304. GPU 304 may include a type of computer chip often used for graphics related tasks such as 3D rendering. In some embodiments, GPU 304 may contain more, smaller, and more specialized cores than a typical CPU, allowing it to run larger sets of functions at once. In addition to 3D rendering, GPU 304 may also be used for other functions, such as those in which operations must be performed on large matrices of data. In non-limiting examples, GPU 304 may have applications in cryptography and machine learning.

Still referring to FIG. 3, in some embodiments, apparatus 300 may include a plurality of streaming multiprocessors, an L2 cache, and/or a DRAM. In some embodiments, each streaming multiprocessor may include one or more instruction schedulers and instruction execution pipelines. In some embodiments, a GPU may group threads into thread blocks and may execute such thread blocks. In some embodiments, dependent instruction latency may be mitigated by switching to execution of other threads.

Still referring to FIG. 3, a processor such as GPU 304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; a processor may be organized according to Von Neumann and/or Harvard architecture as a non-limiting example. A processor may include, incorporate, and/or be incorporated in, without limitation, a microcontroller, microprocessor, digital signal processor (DSP), FPGA, Complex Programmable Logic Device (CPLD), GPU, CPU, Tensor Processing Unit (TPU), analog or mixed signal processor, Trusted Platform Module (TPM), a floating point unit (FPU), system on module (SOM), and/or system on a chip (SoC).

Still referring to FIG. 3, in some embodiments, GPU 304 may use a system on a module (SOM) design. In some embodiments, a SOM GPU may include NVIDIA Jetson NX or Google Coral. In some embodiments, a GPU may use a Chip Down Design.

Still referring to FIG. 3, in some embodiments, apparatus 300 may include a GPU dedicated memory. A dedicated memory may be physically closer to GPU 304 and may be configured for fast and/or efficient access by GPU 304. In some embodiments, a dedicated memory for GPU 304 may include persistent memory. In some embodiments, a dedicated memory for GPU 304 may include temporary memory. In some embodiments, inclusion of a dedicated memory for GPU 304 may improve the efficiency of apparatus 300 in comparison to retrieval of information from a general purpose memory. Optionally, a dedicated memory for GPU 304 may include 72-bit DDR4 memory. In some embodiments, GPU dedicated memory may be accessible only by GPU 304. In some embodiments, GPU dedicated memory may be accessible by GPU 304, CPU 308, and/or FPGA 316.

Still referring to FIG. 3, software run on apparatus 300 may include a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Still referring to FIG. 3, in some embodiments, apparatus 300 may include Central Processing Unit (CPU) 308. CPU 308 may include a general purpose computer processor. CPU 308 may include a Reduced Instruction Set Computer (RISC) processor. In some embodiments, RISC processors may include less complicated functions than a Complex Instruction Set Computer (CISC). In some embodiments, this may allow individual instructions to be performed more quickly on a RISC processor than a CISC processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozen of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory 312A and/or 312B may be accessed through LOAD i.e., to load a memory location and STORE i.e., to write to it, wherein all other instructions may operate on one or more processor registers and processor may not have direct access to manipulate memory 312A and/or 312B. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory 312A and/or 312B, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like. Exemplary embodiments of CPUs are described in further detail below with reference to FIG. 2.

Still referring to FIG. 3, in some embodiments, apparatus 300 may include CPU dedicated memory, such as CPU dedicated memory 312A and 312B. In some embodiments, CPU dedicated memory 312A and/or 312B may include persistent memory. In some embodiments, CPU dedicated memory 312A and/or 312B may include temporary memory. In some embodiments, inclusion of CPU dedicated memory 312A and/or 312B may improve the efficiency of apparatus 300 in comparison to retrieval of information from a general purpose memory. In some embodiments, CPU dedicated memory 312A and/or 312B may include ECC memory. In some embodiments, CPU dedicated memory 312A and/or 312B may include 72-bit DDR4 memory. In some embodiments, CPU dedicated memory 312A and/or 312B may be accessible only by CPU 308. In some embodiments, CPU dedicated memory 312A and/or 312B may be accessible by GPU 304, CPU 308, and/or FPGA 316.

Still referring to FIG. 3, in some embodiments, apparatus 300 may include Field Programmable Gate Array (FPGA) 316. FPGA 316 may include a chip that may be programmed and/or reprogrammed after manufacturing. FPGA 316 may include a series of registers and logic gates. In some embodiments, FPGA 316 registers may be turned on and off in order to program FPGA 316. This may be used to, for example, run a specific algorithm many times using hardware rather than software instructions. In some embodiments, once configured, FPGA 316 may perform processing functions much faster than software instruction solutions. In some embodiments, FPGA 316 may include a KINTEX UltraSCALE FPGA. In some embodiments, FPGA 316 may include an Intel Agilex 7 FPGA F-Series.

Still referring to FIG. 3, in some embodiments, apparatus 300 may include an FPGA dedicated memory, such as FPGA dedicated memory 320A and 320B. In some embodiments, FPGA dedicated memory 320A and/or 320B may include persistent memory. In some embodiments, FPGA dedicated memory 320A and/or 320B may include temporary memory. In some embodiments, inclusion of FPGA dedicated memory 320A and/or 320B may improve the efficiency of apparatus 300 in comparison to retrieval of information from a general purpose memory. In some embodiments, FPGA dedicated memory 320A and/or 320B may include ECC memory. In some embodiments, FPGA dedicated memory 320A and/or 320B may include 72-bit DDR4 memory. In some embodiments, FPGA dedicated memory 320A and/or 320B may be accessible only by FPGA 316. In some embodiments, FPGA dedicated memory 320A and/or 320B may be accessible by GPU 304, CPU 308, and/or FPGA 316.

Still referring to FIG. 3, in some embodiments, apparatus 300 may include FPGA Mezzanine Card (FMC) 324. In some embodiments, FMC 324 may be used to transfer data in and/or out of FPGA 316. In some embodiments, FMC 324 may connect to an external computing device. In a non-limiting example, apparatus 300 may receive instructions and/or other data through FMC 324. In another non-limiting example, apparatus 300 may output data through FMC 324. FMC 324 may conform to FMC standards.

Still referring to FIG. 3, in some embodiments, apparatus 300 may include Virtual Path Cross-Connect (VPX) module 328. VPX module 328 may conform to VPX standards. VPX module 328 may be used for input and/or output of signals from apparatus 300. VPX module 328 may be communicatively connected to an external computing device and/or an external component of a computing device. VPX module 328 may include a 3U VPX. VPX module 328 may include a 6U VPX.

Still referring to FIG. 3, apparatus 300 may include a processor and a memory that communicate with each other, and with other components, via a bus. A bus may include any of several types of bus structures including, but not limited to, a memory bus, a memory controller, a peripheral bus, a local bus, and any combinations thereof, using any of a variety of bus architectures.

Still referring to FIG. 3, in some embodiments, apparatus 300 may include control and data bus assembly 140 332. Control and data bus assembly 140 332 may connect GPU 304, CPU 308, and/or FPGA 316. Components connected by control and data bus assembly 140 332 may communicate using an API configured to enable the division of processing tasks between the FPGA, the CPU, and the GPU. In some embodiments, an API may allow code to run on varying hardware, such as GPU 304, CPU 308, and/or FPGA 316, rather than being limited to a particular hardware architecture. In some embodiments, different computing tasks may be performed more efficiently on different architectures. For example, a first computing task may be performed more efficiently on GPU 304, a second computing task may be performed more efficiently on CPU 308, and a third computing task may be performed more efficiently on FPGA 316. In another example, a computing task may have multiple components which may be split between GPU 304, CPU 308, and FPGA 316 such that all available processing power is used. In some embodiments, inclusion of GPU 304, CPU 308, and FPGA 316, and division of computing tasks between them, may provide improvements to speed and/or efficiency of apparatus 300.

Still referring to FIG. 3, in some embodiments, GPU 304, CPU 308, and/or FPGA 316 may be configured such that they are capable of running code specific to their architecture. This capability may be in addition to API based programming.

Still referring to FIG. 3, in some embodiments, apparatus 300 may include one or more High Speed Input/Output (HSIO) connections, such as HSIO connections 336A, 336B, and 336C. In some embodiments, HSIO connection 336A may connect GPU 304 with VPX module 328. In some embodiments, HSIO connection 336B may connect CPU 308 with VPX module 328. In some embodiments, HSIO connection 336C may connect FPGA 316 with VPX module 328.

Still referring to FIG. 3, apparatus 300 may include one or more additional memory components. Memory may include various components (e.g., machine-readable media) including, but not limited to, a random-access memory component, a read only component, and any combinations thereof. In one example, a basic input/output system (BIOS), including basic routines that help to transfer information between elements within a computer system, such as during start-up, may be stored in memory. A memory may also include (e.g., stored on one or more machine-readable media) instructions (e.g., software) embodying any one or more of the aspects and/or methodologies of the present disclosure. In another example, memory may further include any number of program modules including, but not limited to, an operating system, one or more application programs, other program modules, program data, and any combinations thereof.

Still referring to FIG. 3, apparatus 300 may also include a storage device. Examples of a storage device include, but are not limited to, a hard disk drive, a magnetic disk drive, an optical disc drive in combination with an optical medium, a solid-state memory device, and any combinations thereof. A storage device may be connected to a bus by an appropriate interface. Example interfaces include, but are not limited to, SCSI, advanced technology attachment (ATA), serial ATA, universal serial bus (USB), IEEE 1394 (FIRE-WIRE), and any combinations thereof. In one example, a storage device (or one or more components thereof) may be removably interfaced with apparatus 300 (e.g., via an external port connector). Particularly, a storage device and an associated machine-readable medium may provide nonvolatile and/or volatile storage of machine-readable instructions, data structures, program modules, and/or other data for apparatus 300. In one example, software may reside, completely or partially, within machine-readable medium. In another example, software may reside, completely or partially, within a processor.

Still referring to FIG. 3, in some embodiments, apparatus 300 may be communicatively connected to an external computing device and/or a component of an external computing device. In some embodiments, apparatus 300 may provide additional computing power to an external computing device. In some embodiments, apparatus 300 may be used to tasks in signal processing, communication, machine learning, graphics rendering, cryptography, and the like.

Still referring to FIG. 3, in some embodiments, one or more applications may be run on apparatus 300. In some embodiments, one or more applications may be run on apparatus 300 using the same operating system. For example, all applications of a plurality of applications may run using the same operating system. In some embodiments, virtual machines and/or partitions may be used to separate processing power and/or memory of apparatus 300. In some embodiments, one or more applications may be isolated from one or more other applications through the use of partitions and/or virtual machines. In some embodiments, separation of applications may prevent them from interfering with each other, for example, by one application using excessive amounts of processing power, causing another application to run more slowly. In some embodiments, separation of applications may prevent applications from making full use of available resources such as memory or processing power.

Still referring to FIG. 3, in some embodiments, one or more mission critical applications may run on apparatus 300. Apparatus 300 may be configured such that applications may be prioritized, and memory and/or processor cores may be allocated as a function of this prioritization. In some embodiments, an application may be deemed mission critical and/or high priority and may have greater access to memory and/or processor cores based on this categorization. For example, an amount of processor cores and/or memory necessary to complete a task within certain parameters (such as within a certain time frame) may be estimated for an application. One or more such estimates may be made. For example, a first estimate designed to have the highest probability of accuracy may be made, and a second estimate designed to represent a worst case scenario of resource usage may be made. In this example, a low priority application may be allocated memory and/or processor cores based on a first estimate, while a high priority application may be allocated memory and/or processor cores based on a second estimate. In some embodiments, which processor cores are allocated to which application may be determined as a function of application priority. For example, if a high priority application and a low priority application both run optimally using CPU cores, then available CPU cores may be allocated to the high priority application before the low priority application. In some embodiments, apparatus 300 may be configured such that a low priority application may be moved off of a processor core in order to make room for a high priority application.

Still referring to FIG. 3, in some embodiments, multi-threading, multiprocessing, and/or symmetric multiprocessing may be used to improve processing times. In some embodiments, multithreading may allow multiple threads to be executed on a processor core concurrently. Multiprocessing may involve the use of multiple processing cores to perform a computing task. Symmetric multiprocessing may include the use of multiple processor cores to perform a single task, where the cores utilize the same memory and operating system. A plurality of identical cores may be used in symmetric multiprocessing. For example, multiple GPU cores may be used in a symmetric multiprocessing task. In another example, multiple CPU cores may be used in a symmetric multiprocessing task.

Still referring to FIG. 3, in some embodiments, multiple processing cores may be allocated to implementing a single program instruction set. In some embodiments, GPU cores and CPU cores may both be used to implement a single program instruction set. This may be enabled, for example, by an API described herein. In a non-limiting example, a GPU may include a first plurality of cores, a CPU may include a second plurality of cores, apparatus 300 may receive a program instruction set, and apparatus 300 may allocate a first core from the first plurality of cores and a second core from the second plurality of cores to the program instruction set. In some embodiments, such a program instruction set may be stored in local memory. In some embodiments, such a program instruction set may be received from an external device. In some embodiments, apparatus 300 may be partitioned such that such a program instruction set operates on a separate partition from other programs. In some embodiments, apparatus 300 may run a virtual environment and/or operating system on a set of cores and memory allocated to program instruction set. In some embodiments, cores and/or memory allocated to program instruction set may be connected selectively through an FGPA. This may prevent, for example, access of memory allocated to program instruction set by a nonsecure program.

Still referring to FIG. 3, in some embodiments, apparatus 300 may be configured to initiate a secure boot process when apparatus 300 and/or a computing device communicatively connected to apparatus 300 is powered on or restarted. In some cases, apparatus 300 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, apparatus 300 may include a plurality of TPMs, each contain an RSA key pair known as "Endorsement key (EK)," wherein the RSA key pair may be maintained inside of a TPM and cannot be accessed by non-secure software. In some cases, a first partition may include a bootloader (i.e., the first piece of software that runs). In some cases, bootloader may be verified, for example, one or more apparatus 300 firmware may be configured to check bootloader's digital signature before execution using keys e.g., public keys stored in TPM or another secure component. In case where bootloader's signature doesn't match, apparatus 300 may halt, preventing potential malicious partitions from running. Once bootloader is verified and executed, a hypervisor may be instantiated. In some cases, a hypervisor may also be verified through an associated digital signature to ensure its authenticity. In a non-limiting example, apparatus 300 may boot only with trusted and authenticated partitions e.g., a primary partition and plurality of child partitions. Child partitions may be verified before loading, or trusted version of second partition may be loaded. Hypervisor may be configured to prevent any child partition that yields a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, apparatus 300 may be configured to boot into a safe mode, attempting to restore a trusted software version, or simply halting a processor and/or primary partition to prevent potential threats.

Still referring to FIG. 3, in some embodiments, data stored on apparatus 300 may be protected by one or more security measures. Security measures may include, in non-limiting examples, storage in a database, password protection, multi factor authentication, hashing, encryption, digital signatures, inclusion in a blockchain, and the like. Cryptographic systems and blockchain are described further herein.

Still referring to FIG. 3, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 3, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 3, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 3, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Still referring to FIG. 3, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 3, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 3, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 3, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 3, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 3, keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 3, cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Still referring to FIG. 3, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still referring to FIG. 3, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

Still referring to FIG. 3, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 3, datum may include a time-varying datum, which may have a time limit after which time-varying datum is no longer valid. Time limit may be calculated from an initial time, which may be a datum linked to a particular timestamp or other value representing a fixed moment in time, associated with time-varying datum; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 3, a step may include performing a trusted time evaluation of a variable by a processor. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a datum is an authentic datum that has the property of attested time. Generating a secure timestamp may be used to weed out spoofers or "man in the middle attacks."

Still referring to FIG. 3, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using datum. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. [data], along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, a data store or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Figure 4:
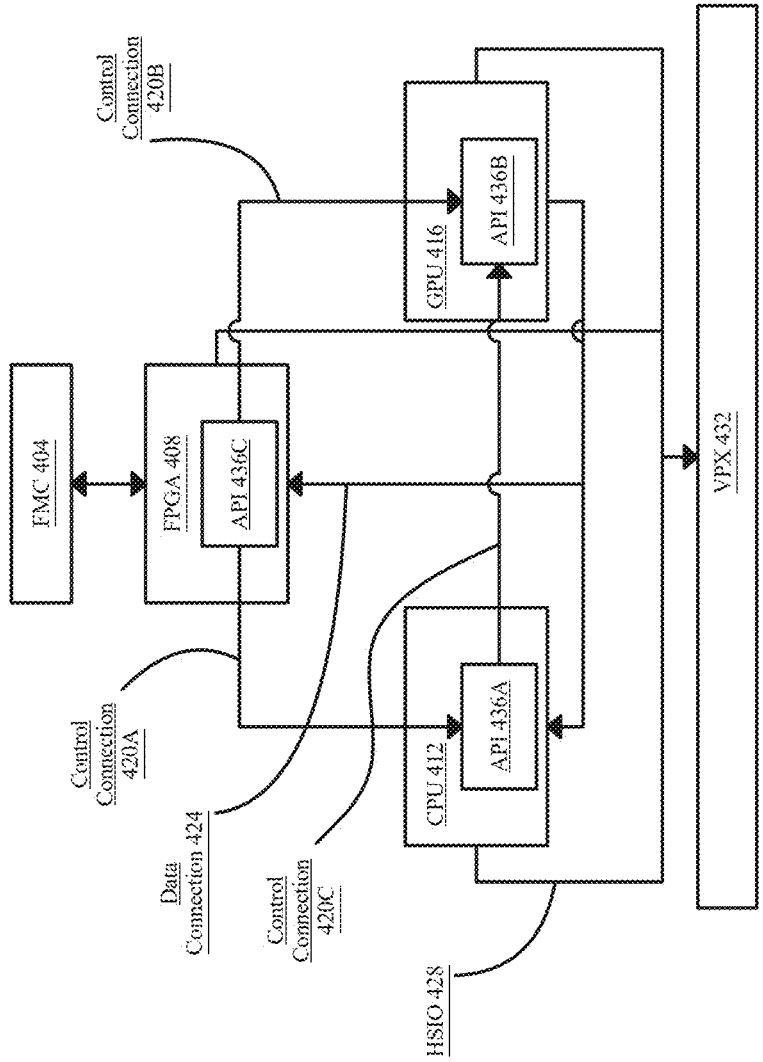
FIG. 4 is a diagram depicting an exemplary apparatus for heterogenous processing including an API.

Now referring to FIG. 4, an exemplary embodiment of apparatus 400 is provided. Apparatus 400 may include FMC 404 communicatively connected to FPGA 408. Apparatus 400 may also include CPU 412, GPU 416, and control connections between FPGA 408, CPU 412 and/or GPU 416. Such control connections may include control connection 420A from FPGA 408 to CPU 412, control connection 420B from FPGA 408 to GPU 416, and/or control connection 420C from CPU 412 to GPU 416. Apparatus 400 may also include data connection 424 from GPU 416 to CPU 412 and/or FPGA 408. Apparatus 400 may also include HSIO connection 428. HSIO connection 428 may transfer data between VPX 432, CPU 412, FPGA 408, and/or GPU 416. In some embodiments, CPU 412 may include API 436A, GPU 416 may include API 436B, and FPGA 408 may include API 436C. In some embodiments, APIs 436A, 436B, and 436C may each accept the same inputs. In some embodiments, APIs 436A, 436B, and 436C may each be used to interpret code using the APIs such that they may be executed on hardware to which the processing task is assigned.

Figure 5:
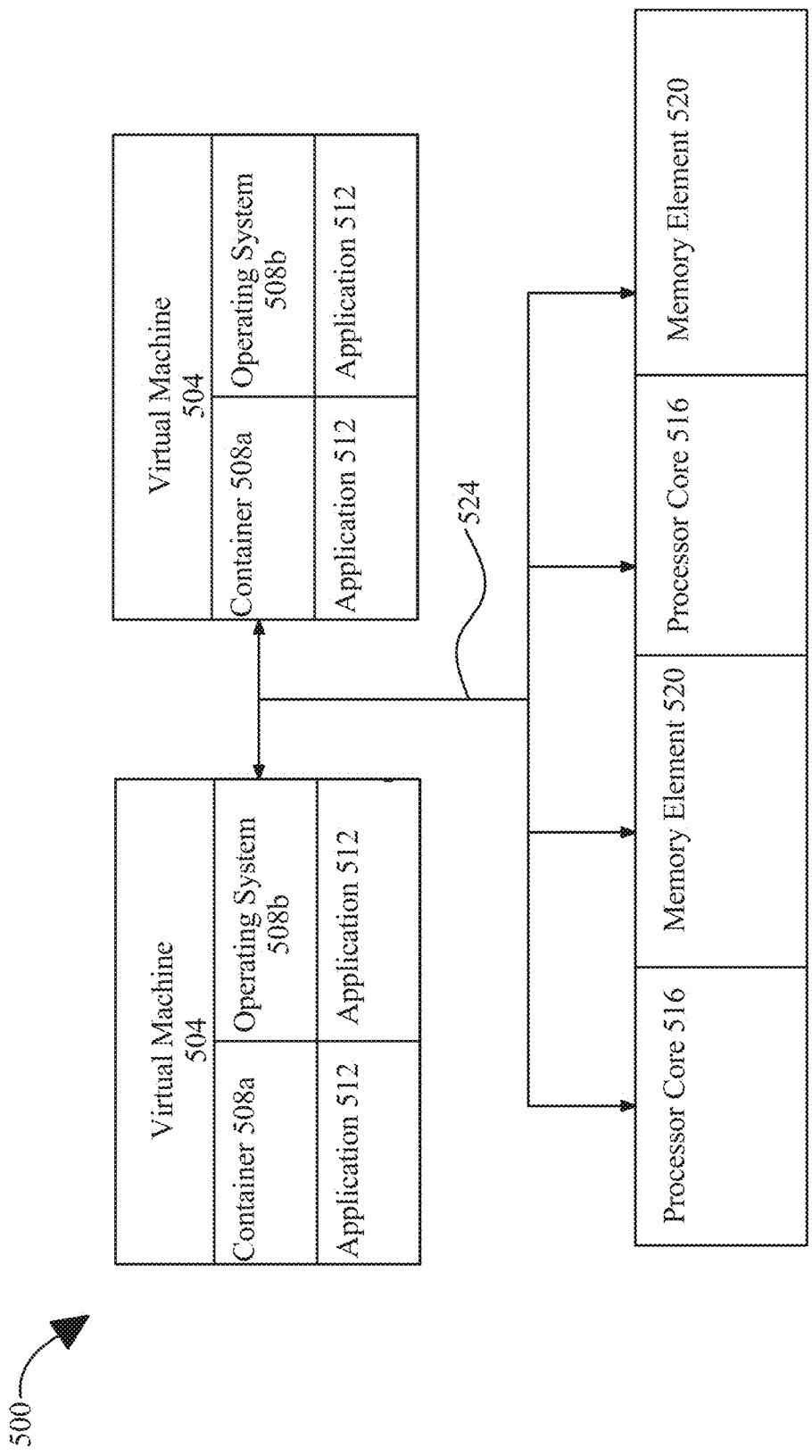
FIG. 5 is a block diagram illustrating an exemplary embodiment of a virtual environment.

Referring now to FIG. 5, an exemplary embodiment of a virtual environment 500 is illustrated. Virtual environment includes one or more virtual machines 504, which may be implemented in any manner described above and/or in disclosures incorporated herein by reference. Each virtual machine 504 may run a container 508*a* and/or operating system 508*b*, executing applications 512, which may include without limitation third-party applications, in the virtual machine 504. Virtual machines 504 and/or components therein may interface with one another, with other virtual environments, virtual machines, applications, operating systems, or the like, and/or with physical components such as processor cores 516 and/or memory elements 520 such as dedicated memory units and/or partitions, via a virtual bus 524. As used in this disclosure, a "virtual bus" is a software construct that mimics the functionality of a physical bus.

In an embodiment, (I/O) virtual bus 524 may include a virtualization of I/O physical bus that facilitates communication between different components within virtual environment or even different virtual environments. In a non-limiting example, virtual bus 524 may connect first partition with second partition. In some cases, a management VM (i.e., first partition) may send one or more administrative commands to software module (i.e., second partition). Additionally, virtual bus 524 may also connect first partition with a plurality of third partitions, allowing management VM to communicate with other ancillary or service-oriented partitions as described above. Virtual bus 524 may be set up in such a way that second partition is isolated from direct communication with plurality of third partitions; this means that any communication to or from second software module must go through first partition. In this case, software application running on second partition may not be able to directly access or be accessed by one or more services or functions running on plurality of third partitions. In a non-limiting example, plurality of third partitions may include various utility services e.g., logging, diagnostics, communication, backup services, wherein the virtual bus 524 may ensure second partition e.g., flight navigation system can only communicate with a controller-management VM, and not directly with other utility services which may be less secure. Virtual bus may connect, without limitation, to an exterior virtual environment.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hardware apparatus for network communications, the hardware apparatus comprising:
   a graphics processing unit comprising a first dedicated memory and a first plurality of processing cores;
   a central processing unit comprising a second dedicated memory and a second plurality of processing cores;
   a modular network interface configured to connect the hardware apparatus to a plurality of portable ground control stations; and
   a plurality of logic circuits wherein one or more logic circuits of the plurality of logic circuits are configured for at least one data protocol and wherein the plurality of logic circuits are configured to:
      receive transmission data from the modular network interface from a first portable ground control station of the plurality of portable ground control stations, wherein the transmission data comprises header information;
      identify at least one logic circuit of the plurality of logic circuits as a function of the header information;
      decode the transmission data using the at least one logic circuit; and
      route the decoded transmission data to a second portable ground control station of the plurality of portable ground control stations.

2. The hardware apparatus of claim 1, wherein routing the decoded transmission data comprises routing the decoded transmission data to the first processing core.

3. The hardware apparatus of claim 1, wherein routing the decoded transmission data to the first processing core comprises routing the decoded transmission data through a dedicated communication protocol.

4. The hardware apparatus of claim 1, wherein decoding the transmission data using the at least one logic circuit comprises converting the transmission data from a first data protocol to a second data protocol.

5. The hardware apparatus of claim 1, wherein routing the decoded transmission data comprises routing the decoded transmission data through the modular network interface.

6. The hardware apparatus of claim 1, wherein routing the transmission data comprises routing the transmission data to the first program instruction set through a virtual network interface.

7. The hardware apparatus of claim 1, wherein the hardware apparatus comprises a participating node within a communication network.

8. The hardware apparatus of claim 1, wherein the hardware apparatus is further configured to:
   receive a second program instruction set; and
   allocate a third processing core from the first plurality of processing cores and a fourth processing core from the second plurality of processing cores to the second program instruction set.

9. The hardware apparatus of claim 8, further comprising:
   a first display port configured to receive a first datum from the first instruction set and route the first datum to a first display device; and
   a second display port configured to receive a second datum from the second instruction set and route the second datum to a second display device.

10. The hardware apparatus of claim 1, wherein the plurality of logic circuits comprise a field programmable gate array (FPGA).

11. A hardware apparatus for network communications, the hardware apparatus comprising:
    a graphics processing unit comprising a first dedicated memory and a first plurality of processing cores;
    a central processing unit comprising a second dedicated memory and a second plurality of processing cores;
    a modular network interface configured to connect the hardware apparatus to a plurality of portable ground control stations; and
    a plurality of logic circuits wherein one or more logic circuits of the plurality of logic circuits are configured for at least one data protocol and wherein the plurality of logic circuits are configured to:
       receive transmission data from a first portable ground control station of the plurality of portable ground control stations, wherein the transmission data comprises header information;
       identify at least one logic circuit of the plurality of logic circuits as a function of the header information;
       encode the transmission data as a function of the transmission data and the at least one logic circuit; and
       route the encoded transmission data to a second portable ground control station of the plurality of portable ground control stations through the modular network interface.

12. The hardware apparatus of claim 11, wherein receiving the transmission data comprises receiving the transmission data from the first processing core.

13. The hardware apparatus of claim 11, wherein receiving the transmission data comprises receiving the transmission data through a dedicated communication protocol.

14. The hardware apparatus of claim 11, wherein encoding the transmission data as a function of the transmission data and the at least one logic circuit comprises converting the transmission data from a first data protocol to a second data protocol.

15. The hardware apparatus of claim 11, wherein receiving the transmission data comprises receiving the transmission data from the modular network interface.

16. The hardware apparatus of claim 11, wherein receiving the transmission data comprises receiving the transmission data from the first program instruction set through a virtual network interface.

17. The hardware apparatus of claim 11, wherein the hardware apparatus comprises a participating node within a communication network.

18. The hardware apparatus of claim 11, wherein routing the transmission data through the modular network interface comprises:
    identifying one or more available communication networks communicatively connected to the modular network interface; and
    routing the transmission data through at least one communication network of the one or more communication networks.

19. The hardware apparatus of claim 18, wherein routing the transmission data through the at least one communication network comprises:
    selecting the at least one communication network as a function of the identification;

identifying a data protocol of the at least one communication network;

modifying the transmission data as a function of the data protocol; and routing the modified transmission data as a function of the data protocol.

20. The hardware apparatus of claim 18, wherein identifying the one or more communication networks comprises identifying the one or more communication networks as a function of a discovery request.

* * * * *